United States Patent
Kwon

(10) Patent No.: US 9,384,483 B2
(45) Date of Patent: Jul. 5, 2016

(54) METHOD AND SYSTEM FOR GLOBALLY SHARING AND TRANSACTING DIGITAL CONTENTS

(75) Inventor: Kwang-mog Kwon, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 2928 days.

(21) Appl. No.: 11/315,307

(22) Filed: Dec. 23, 2005

(65) Prior Publication Data
US 2006/0143435 A1 Jun. 29, 2006

(30) Foreign Application Priority Data

Dec. 24, 2004 (KR) .................. 10-2004-0112135

(51) Int. Cl.
*G06F 21/00* (2013.01)
*G06Q 20/38* (2012.01)
*G06F 21/10* (2013.01)

(52) U.S. Cl.
CPC .............. *G06Q 20/382* (2013.01); *G06F 21/10* (2013.01); *G06Q 20/3829* (2013.01)

(58) Field of Classification Search
USPC ............ 705/51, 16, 21, 59; 380/44, 262, 278, 380/279
See application file for complete search history.

(56) References Cited

U.S. PATENT DOCUMENTS

| | | | | |
|---|---|---|---|---|
| 6,240,416 B1* | 5/2001 | Immon | ............ | G06F 17/30575 |
| 6,785,768 B2* | 8/2004 | Peters et al. | ................... | 711/112 |
| 6,799,180 B1* | 9/2004 | McGrath | ........... | G06F 17/30817 |
| 7,120,609 B1* | 10/2006 | Kerkdijk | ........................ | 705/78 |
| 2002/0022962 A1* | 2/2002 | Richardson | ........................ | 705/1 |
| 2002/0048369 A1* | 4/2002 | Ginter | ..................... | G06F 21/10 380/277 |
| 2002/0103727 A1* | 8/2002 | Tait et al. | ........................ | 705/28 |
| 2002/0156695 A1* | 10/2002 | Edwards | ......................... | 705/26 |
| 2003/0110132 A1* | 6/2003 | Sako | ................................ | 705/51 |
| 2003/0154390 A1* | 8/2003 | Yamauchi | ................ | H04N 5/76 713/193 |
| 2003/0191659 A1* | 10/2003 | Okita et al. | ........................ | 705/1 |
| 2003/0217366 A1* | 11/2003 | Takahashi | .......... | H04N 7/17318 725/98 |
| 2004/0098533 A1* | 5/2004 | Henshaw et al. | ............ | 711/100 |
| 2005/0267801 A1* | 12/2005 | Kaufman | ......................... | 705/14 |
| 2007/0005795 A1* | 1/2007 | Gonzalez | ....................... | 709/232 |
| 2007/0005796 A1* | 1/2007 | Reynders | ............ | H04L 12/2898 709/232 |

FOREIGN PATENT DOCUMENTS

| | | |
|---|---|---|
| JP | 2001-357234 A | 12/2001 |
| JP | 2002-318981 A | 10/2002 |
| KR | 2000-0053815 A | 9/2000 |
| KR | 20010035031 | 5/2001 |
| KR | 2002-0011670 A | 2/2002 |
| KR | 20030070480 | 8/2003 |
| KR | 20040073630 | 8/2004 |

\* cited by examiner

*Primary Examiner* — Dante Ravetti
(74) *Attorney, Agent, or Firm* — Sughrue Mion, PLLC

(57) ABSTRACT

A method and system for globally sharing and transacting service including a digital content is provided. The method includes registering a digital content with a global multi-service platform (MSP), storing metadata or an electronic catalog for the digital content generated in a universal language or a local language, sharing the registered digital content and global metadata between a local MSP and the global MSP, implementing, if necessary, a distribution agreement or a supply agreement on a selected portion of the digital content between a local MSP and the global MSP, and sending the selected portion of the digital content from the global MSP and/or the local MSP storing the digital content to a customer terminal.

29 Claims, 14 Drawing Sheets

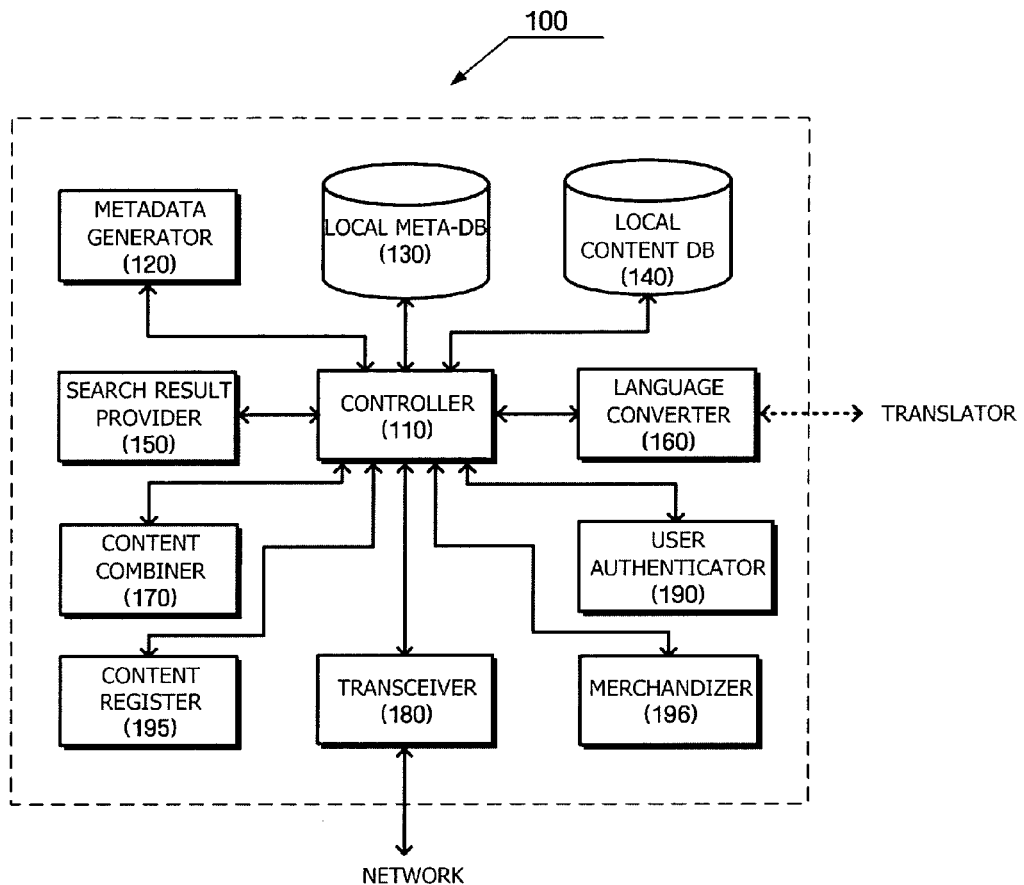

FIG. 7

```xml
<?xml version="1.0" encoding="euc-kr"?>
    <content type="moving picture">
        <title> THREE FRIENDS </title>
        <genre> DRAMA </genre>
        <file type> AVI </file type>
            .
            .
            .
        <price> $20 </price>
    </content>
    <content type="audio">
        <title> THREE FRIENDS </title>
        <genre> DRAMA </genre>
        <file type> MP3 </file type>
            .
            .
            .
        <price> $5 </price>
    </content>
    <content type="scrypt">
        <title> THREE FRIENDS </title>
        <genre> DRAMA </genre>
        <file type> DOC </file type>
            .
            .
            .
        <price> $1 </price>
    </content>
```

METHOD AND SYSTEM FOR GLOBALLY
SHARING AND TRANSACTING DIGITAL
CONTENTS

CROSS-REFERENCE TO RELATED
APPLICATION

This application claims priority from Korean Patent Application No. 10-2004-0112135 filed on Dec. 24, 2004 in the Korean Intellectual Property Office, the disclosure of which is incorporated herein by reference in its entirety.

BACKGROUND OF THE INVENTION

1. Field of the Invention

Systems and methods consistent with the present invention relate to globally distributing a service containing digital contents, and more particularly, to globally sharing and transacting digital contents owned by each local multi-service platform (MSP) and associated metadata in a standardized format by allowing each local MSP to participate in a global MSP consisting of a master MSP acting as a global hub for distribution of digital contents and a solution market place.

2. Description of the Related Art

Advancement of the Internet and proliferation of broadband communications have led to the widespread distribution of digital contents. For example, a user can access the Internet on personal computer (PC), mobile phone, personal digital assistant (PDA), television (TV), or refrigerator to purchase contents including sound such as bell ring/music, pictures, motion video, Avatar, or other various information or use on-line services such as Internet banking and booking. The user is also allowed to purchase a restricted range of contents originating in other countries or networks via the Internet. However, the range of contents retrievable is too restricted for a user to freely purchase the contents being sold in other countries.

A conventional digital content transaction system shown in FIG. 1 includes a digital content provider server 11, a service provider server 12, a payment gateway (PG) server 13, a banking authority server 14, and an end customer terminal 15.

The digital content provider server 11 is an individual or enterprise producing/providing digital contents, and provides the service provider server 12 with digital contents or directly sells the digital contents to B2B (Business-to-Customer) based customers. The service provider server 12 is a server providing customers with digital contents, such as an internet portal site, a web community site, or a digital content resource center (DCRC). In this manner, the service provider server 12 receives digital contents from the digital content provider server 11 and performs sales on the customers. In a case where the digital content provider server 11 directly sells the digital contents to customers, the service provider server 12 and the digital content provider server 11 may be the same server performing intrinsic functions of both servers.

In more detail, the digital content provider server 11 includes a digitizing unit for digitalizing analog contents, a storing unit for storing digital contents, a transmitting unit (compression and communication unit) for enabling transmission of digital contents via the Internet, and a controlling unit for comprehensively controlling various activities including classification, storage, retrieval, compression and transmission of contents. The digital content provider server 11 generates and digitizes contents and provides the contents to the service provider server 12 that then provides the contents to a consumer. Digitization of the contents may be performed by the service provider server 12 as well.

The service provider server 12 includes a retrieving unit investigating/collecting digital contents, a storing unit receiving contents from the content provider server 11 and storing the received contents, a digitizing unit digitizing contents as needed, a classifying unit classifying contents, a network interface connecting a consumer to contents, a content providing unit for delivering contents to a consumer through a download or streaming function. For example, when the service provider server 12 is a web server, the service provider server 12 collects and stores contents, displays the contents so that a consumer can access and download the contents on a web through a browser, and sells contents to a consumer.

The end consumer terminal 15 may be a PC connected to the Internet, a PDA or a mobile phone. The end consumer terminal 15 includes a receiving unit searching for digital contents and receiving the retrieved contents through downloading or other methods and a content activating unit playing sound or motion video or setting pictures as wallpaper. A digital content consumer searches for and selects contents and executes a purchase command for the selected contents through the end customer terminal 15.

The PG server 13 performs a settlement, that is, an electronic payment service, based on transaction between the end customer terminal 15 and the service provider server 12 in cooperation with the banking authority server 14 such as a bank or a card company. The electronic payment service is an essential feature in the electronic commerce market and electronic payment is generally made through several types of services including credit card payment, mobile phone payment, phone billing, transfer account, and so on. Some companies provide all of these payment services, called integrated electronic payment services. However, most PG companies provide themselves with only one or two types of payment servers and usually cooperate with other payment companies to thus complement electronic payment service.

Referring to FIG. 2, international transaction is typically made in two ways: global digital content transaction is made between a domestic service provider server 12a and a foreign service provider server 12b, 12c; and global digital contents are purchased by the end consumer terminal 15 directly accessing to a site provided by the foreign service provider server 12b, 12c. The latter transaction, however, has several problems associated therewith due to direct transaction between the end consumer terminal 15 and the foreign service provider server 12b, 12c, in which there is a gap in cultural, linguistic difference. Thus, the former transaction has conventionally been used for global digital content transaction.

In FIG. 2, the PG server 13 performs settlements based on transactions between the end customer terminal 15 and the service provider server 12a, 12b or 12c and is in cooperation with the banking authority server 14 such as a bank or a card company. The end customer terminal 15 inquires and purchases digital contents generated by the digital content provider server 11 through an interface of the service provider server 12a, 12b or 12c.

A conventional global product transaction method using such an integrated market system includes: a local market or sub-market logging-on an integrated market server through a client system; transmitting product information and quantity for each market to the integrated market server through a TCP-IP network; the integrated market server integrating product information transmitted for each market and adjusting selling prices and selling profits, transmitting the integrated product information and adjusted selling prices and profits, and inventory status to the client system and the integrated market server; a client inquiring products and committing a purchase request, the client having accessed to the market or sub-market server through the TCP-IP network or PSTN; the market or sub-market server transmitting client information and settlement information to the integrated market server; the integrated market server transmitting information on product sale approval, settlement authentication and the authenticated contents to the market or sub-market server; transmitting sales details, settlement and inventory states to the market having registered the product sold through the integrated market server; distributing commissions for the sold product between the integrated market server and the market involved in the transaction; and transmitting a changed inventory status for the sold product to all the market servers and client systems associated with the integrated market server.

In the above-described conventional global product transaction method using the integrated market server, multiple languages are supported for user convenience in international transaction. In addition, since each enterprise determines its own product prices, different prices may exist for a single product by manufacturer. However, since no evaluation criteria are available for products, the quality of a certain product cannot be ensured guaranteed. Instead, information on products produced by various manufactures is only shared globally, so that the integrated market server may just serve to integrally mediate global product transaction.

In addition, in the above-described conventional global product transaction method using the integrated market server, only product transaction is mediated while products are delivered in an off-line manner. On the other hand, in a digital content global transaction method, not only transaction but also product delivery should be supported in an on-line manner. In this connection, the digital content global transaction method requires a different transaction method from the conventional method. For example, since products exist in a variety of types of digital files in the digital content global transaction method, digital asset management or digital content copyright management solutions are necessary, unlike in the conventional transaction method. In addition, the digital content global transaction method requires not only basic product information but also products in forms of large-capacity digital files, resulting in a considerable burden in the server capacity. Since a globally standardized system that are identifiable by types or components of digital contents as well as a simple product classification system are necessary and all transactions are carried out in an on-line manner, electronic document interchange (EDI), a trade automation system and electronic payment are requisites and security and authentication programs are also quite important factors.

The currently used conventional digital content distribution method has several problems associated therewith as follows:

First, the conventional digital content distribution method makes it difficult for a consumer to access contents. When the consumer desires to use a specific content, he/she must directly search a web portal site for a service provider who owns the content and visit the web site of the service provider to check if the desired content is provided. Thus, if the web site does not provide the desired content, the consumer must visit another web site.

Second, contents and services are separately designed for different geographical locations, cultures, and languages. A consumer mostly accesses contents originating in foreign countries via the Internet using a PC. However, the consumer encounters difficulty in using foreign contents due to difficulty in understanding language and content classification system. Global distribution is made for an extremely restricted range of contents.

Third, the conventional digital content distribution method suffers inconvenience in use because a service being provided is highly dependent on a terminal. For conventionally distributed digital contents, because the type of services available varies according to the type of a terminal (e.g., a PC, a mobile phone, a television, etc.), a user interface, a transmission channel, a content type, and a content format are different for each terminal type. Thus, to purchase a desired content, a consumer must access a service that provides the desired content only through a specific device. Sharing of the same content between devices is limited to specific cases such as transmission of images and music between PC and mobile phone.

Fourth, since a content provider and a service provider need to separately design or individually customize contents according to the specification of each terminal, the conventional digital content distribution method involves repetitive processes. For a conventional content platform, contents must be designed separately or customized for each specific device so that contents designed according to the specification of a specific device can be run on the device. Thus, these repetitive processes cause inefficiency.

SUMMARY OF THE INVENTION

According to an aspect of the present invention, there is provided a method and system for allowing a digital content consumer to conveniently search for and access various global contents and services without restriction to a customer terminal type using global real-time sharing of digital content while allowing a service provider to provide content by minimizing an unnecessary repetitive process.

According to another aspect of the present invention, there is provided a method and system of globally transacting a digital content in a real-time basis by internationally standardizing different classification systems, transaction types and content formats of the digital content for different local MSPs and allowing a local MSP as a local multi-service platform and a master MSP acting as a global hub to access a global solution transaction server for execution of real-time transaction based on a characteristic transaction method of independently storing digital content data elements.

According to still another aspect of the present invention, there is provided a method for globally sharing and transacting a digital content in a sending local MSP, the method including generating the content and global metadata for the content in a sending local MSP, implementing a distribution agreement of the generated contents between the sending local MSP and a global MSP, sharing registered contents and global metadata between the local MSP and global MSP, implementing a sales agreement on at least some selected portion of the content shared in a receiving local MSP with the global MSP of the generated content, and receiving the selected portion of the content from the global MSP and transmitting the same to a customer terminal.

According to still another aspect of the present invention, there is provided a system for globally sharing and transacting a digital content including means for generating the content in a sending local MSP and global metadata for the generated content, means for implementing a distribution agreement for the generated content between the sending local MSP and a global MSP, means for sharing the registered content and the global metadata between the local MSP and the global MSP, means for implementing a sale agreement for at least some of selected content of the shared content between a receiving local MSP and the global MSP, means for receiving the selected content from the global MSP and transmitting the same to a customer terminal, and means for implementing payment based on transaction between each of the sending local MSP, the receiving local MSP, and the global MSP.

BRIEF DESCRIPTION OF THE DRAWINGS

The above and other features and advantages of the present invention will become more apparent by describing in detail exemplary embodiments thereof with reference to the attached drawings in which:

FIG. 5 is a block diagram of a local MSP according to an exemplary embodiment of the present invention;

FIG. 6 shows an example of indicating metadata for each content to a user;

FIG. 7 shows an example in which the metadata of FIG. 6 is created in an Extensible Markup Language (XML) file;

DETAILED DESCRIPTION OF EXEMPLARY EMBODIMENTS

Figure 1:
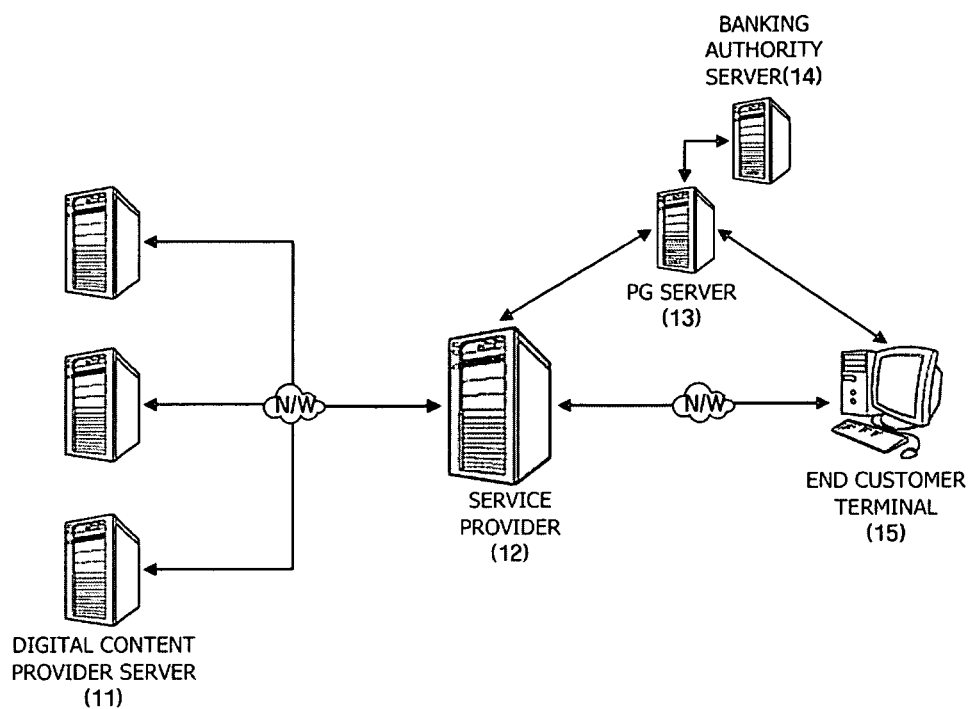
FIG. 1 shows a conventional digital content transaction system.

The present invention will now be described more fully with reference to the accompanying drawings, in which exemplary embodiments of this invention are shown. Advantages and features of the present invention and methods of accomplishing the same may be understood more readily by reference to the following detailed description of the exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

In an exemplary embodiment of the present invention, each multi-service platform (abbreviated as "MSP") participates in a global MSP consisting of a master MSP acting as a global hub for distribution of a digital content and a global solution transaction server and globally shares metadata for its own digital content in a standardized format with another local MSP. Hereinafter, "global sharing" can be understood as including a plurality of local MSPs instead of worldwide sharing. Thus, if each city corresponds to a local MSP, a nation including multiple cities may be a global MSP.

Unlike a conventional distribution approach whereby each local MSP provides its subscribers with its own digital content as well as a restricted range of contents originating in foreign countries or other networks, the present invention allows subscribers to each local MSP to go beyond the boundary of digital contents owned by the local MSP and efficiently access various global contents within a global MSP. An exemplary embodiment of the present invention also provides a method and system for globally distributing contents designed to easily process activities associated directly or indirectly with global distribution such as advertising, merchandising, billing, and copyright related matters in an integrated manner, which were conventionally performed individually upon purchase of external contents.

An MSP refers to a system that allows classification, storage, execution, and management of all available services (including contents) that can be digitalized and global distribution of content and services through association between different MSPs. The detailed concept of MSP will now be described. The "multi" in the MSP means providing any content requested by a consumer through the most suitable channel without restriction to media, i.e., regardless of the type of terminal used by an end user. The "service" is a broad term including a solution and refers to tangible or intangible products that fit consumer's request or needs in a satisfactory way in return for transaction. The "platform" refers to an infrastructure supported to remove overlapping/repetitive elements while providing a multi service to a consumer and meet various and complicated consumer's needs in a timely manner.

Here, a "solution" refers to a service simultaneously providing a system and an associated service. A home network solution refers to a solution in which various daily convenience services are provided through internetworking among multiple terminal devices including TV, refrigerator, washing machine, robot cleaner, locking device on the front door, gas valve, oven, electric curtain, lighting, coffee port, audio player, and mobile phones when a specific condition predefined by a user is met. For example, lighting in the living room and TV are turned on and an oven and a washing machine begin to operate when a user returns home. That is, the home network solution is considered as a solution that provides a system such as terminal devices and network together with services that customize various predefined automatic operating conditions.

Figure 3:
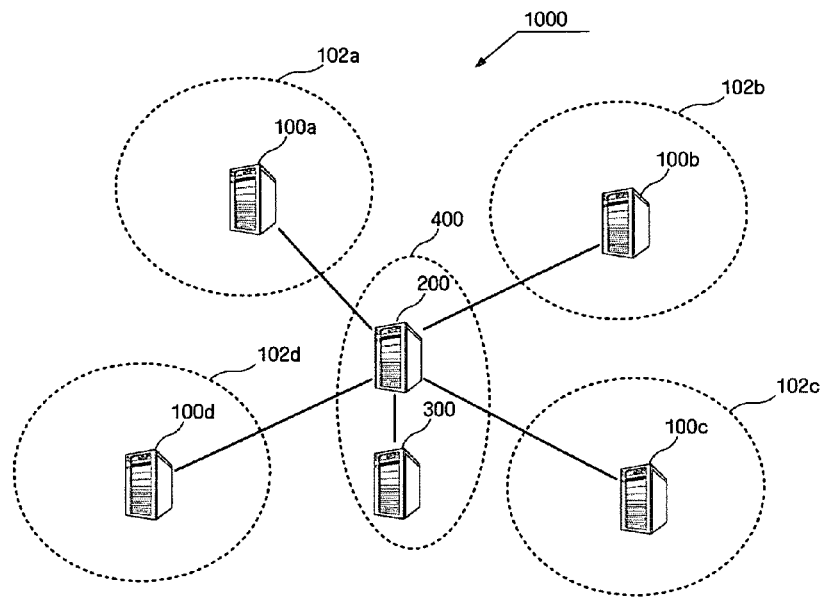
FIG. 3 shows a digital content transaction system according to an exemplary embodiment of the present invention.

Referring to FIG. 3, a digital content transaction system 1000 includes local MSPs 100a through 100d acting as hubs of corresponding local content transaction systems 102a through 102d, a master MSP 300 creating and managing a global standard for all contents provided by the local MSPs 100a through 100d, and a global solution transaction server 200 supporting transaction and cooperation among the local MSPs 100a through 100d and the master MSP 300. The master MSP 300 and the global solution transaction server 200 are combined into a single global MSP 400.

Figure 2:
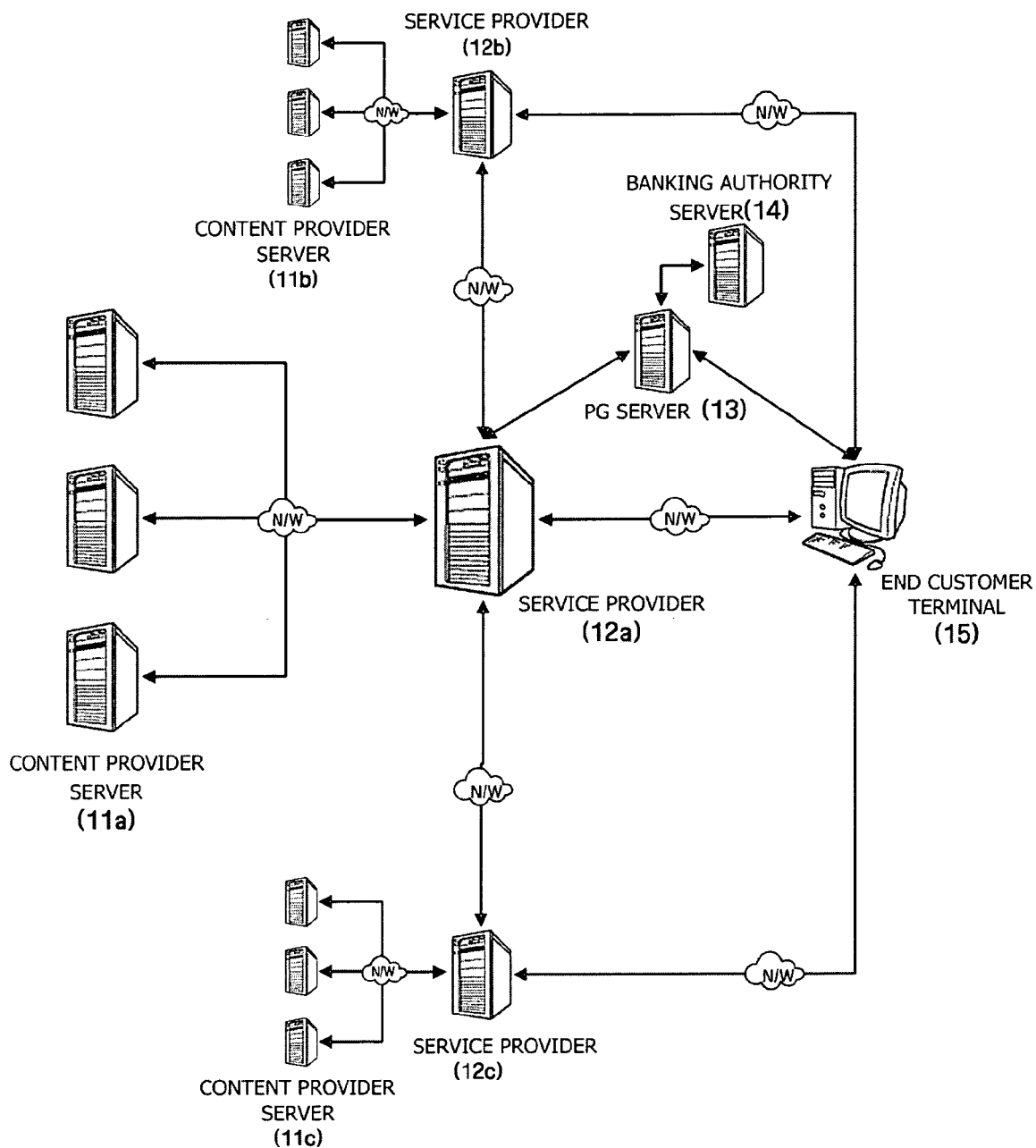
FIG. 2 shows an example of international content transaction implemented in a conventional manner.

The relation between one of the local MSPs 100a through 100d and the master MSP 300 is not defined by a specific criterion such as geography, culture, or language. For example, in terms of geography, when one master MSP 300 and a plurality of local MSPs 102a through 102d exist within a nation, the master MSP 300 may act as a local MSP in a global perspective. That is, the master MPS 300 may serve as both the master MSP and the local MSP. While FIG. 2 shows that only one master MSP 300 exists within the entire system 1000 for convenience's sake, an upper master MSP 300 may be present.

It is also assumed that there is no restriction to the type and range of content or service being shared and transacted through the local MSPs 102a through 102d and the content and service include all intangible property that can be transacted via a network. Metadata is used between MSPs as a global standard for contents. The metadata refers to data specifically and objectively describing a content classified according to a standard content classification system. For example, the metadata may include the title, file type, size, genre, length, language, creation date, owner, and price of the content. The global sharing of metadata allows transaction of contents through the global solution transaction server 200 and global distribution of contents. More specifically, each of the local MSPs 102a through 102d includes a local meta-database (DB) storing metadata in the language of a local MSP in which a content originates and creates metadata in a universal language, i.e., global metadata that can be used across the entire global MSP. The global solution transaction server 200 receives the metadata in a universal language and registers the received metadata in a global meta-DB. The metadata is connected to a global meta-DB in the master MSP 300 and converted into local languages for the local MSPs 102a through 102d linked to the master MSP 300 for storage. The converted metadata are shared with the local MSPs 102a through 102d, thereby enabling the global distribution of content.

Figure 4:
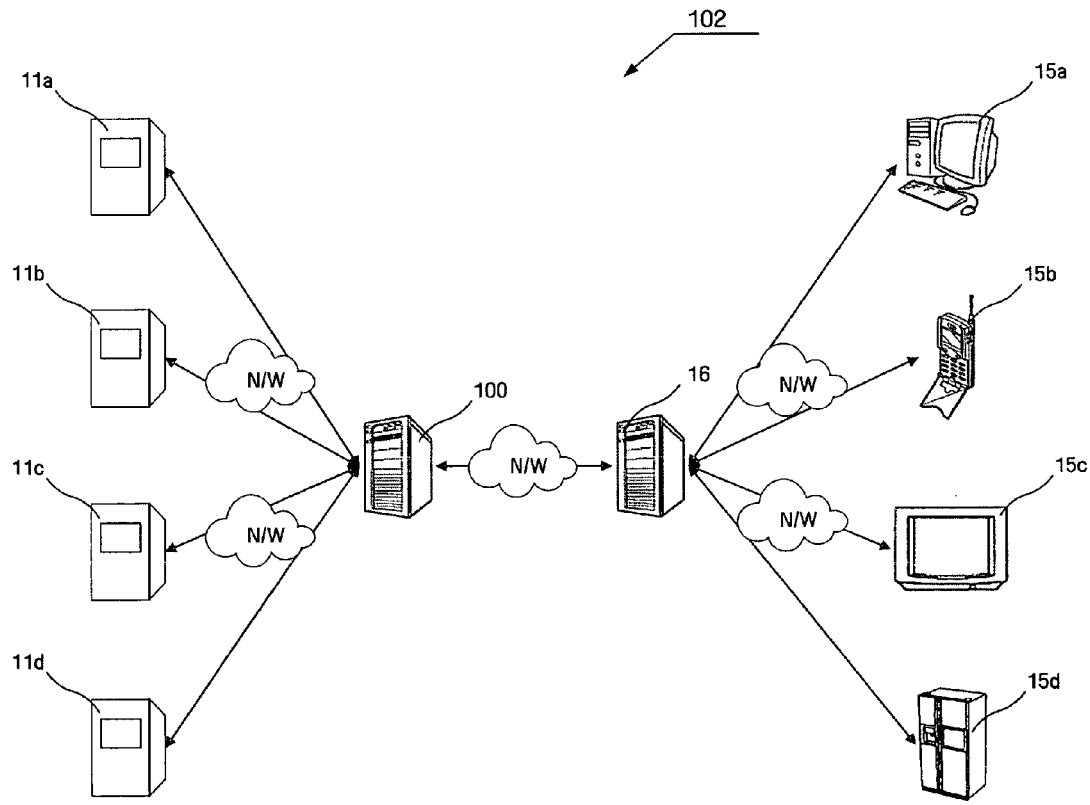
FIG. 4 shows an example of a local content transaction system according to an exemplary embodiment of the present invention.

FIG. 4 shows an example of a local content transaction system 102 according to an exemplary embodiment of the present invention. Referring to FIG. 4, the local content transaction system 102 includes at least one content provider server 11a through 11d creating a content consisting of video, image, icon, sound, or a combination of all or some of them, a local MSP 100 connecting to the content provider servers 11a through 11d via the Internet or other network and receiving the created content, at least one customer terminal 15a through 15d paying the local MSP 100 a predetermined fee for receiving streaming or download services for the content through a predetermined network provided by a telecommunications service provider server 16, and a telecommunications service provider server 16.

Here, the network provided by the telecommunications service provider server 16 may be one of various types of networks such as wired/wireless Internet, wired/wireless broadcasting network, and wired/wireless telephony network. Thus, the customer terminals 15a through 15d may include various devices such as a PC, a digital TV, a mobile phone, a personal digital assistant (PDA), and home electronics.

Because the content provider servers 11a through 11d, the telecommunications service provider server 16, and the customer terminals 15a through 15d can be implemented in a conventional manner, a detailed explanation thereof will not be given.

FIG. 5 is a block diagram of a local MSP 100 according to an exemplary embodiment of the present invention. Referring to FIG. 5, the local MSP 100 includes a controller 110, a metadata generator 120, a local meta-DB 130, a local content DB 140, a search result provider 150, a language converter 160, a content combiner 170, a transceiver 180, a user authenticator 190, a content register 195, and a merchandizer 196. Logically, the local MSP 100 may be divided into a sending local MSP and a receiving local MSP, which is, however, applied to a case where one content is globally transacted and the sending local MSP and the receiving local MSP may be changed for the other content. Thus, the local MSP 100 shown in FIG. 5 may be understood to encompass both functions as the sending local MSP and the receiving local MSP. Of course, the local MSP 100 shown in FIG. 5 may also be implemented as a local MSP functioning as only a sending local MSP or only a receiving local MSP.

The controller 110 controls operations of other components in the local MSP 100 and includes a central processing unit (CPU) and an operating system (OS).

The metadata generator 120 uses a content received from a content provider (CP) to generate metadata. The metadata refers to data specifically and objectively describing contents classified according to a standard content classification system. For example, the metadata may include title, file type, capacity, play time, bit-rate, genre, language, creation date, owner, and price of the content. When the metadata is recorded in a header of the content as additional information, it is identified while reading the content. When the metadata is not recorded directly in the content, it is identified while previewing the content. In the former case, the metadata may include the title, genre, language, creation date, owner and price. In the latter case, the metadata may include file type, capacity, bit-rate, and length. The metadata may be generated by the CP and provided separately from the content. In this case, the local MSP 100 may not necessarily include the metadata generator 120.

The thus extracted metadata may be generated in a predetermined format such as a markup language. Examples of the markup language include hyper-text markup language (HTML), standard generalized markup language (SGML), XML, and so on.

FIG. 6 shows an example of indicating metadata for each content to a user. Here, the content is a moving picture, an audio, or a script. The moving picture refers to a combination of a video and an audio or a video, an audio and a script. As evident in a data position column, since the audio and script are stored separately from the video, the audio and script are present in a master MSP while the video exists in a Korean MSP.

FIG. 7 shows an example in which the metadata of FIG. 6 is described in an Extensible Markup Language (XML) file. The metadata can be efficiently represented in a structured XML document as shown in FIG. 7 and transmitted to another device in the same structured format.

Turning to FIG. 5, the local meta-DB 130 stores the generated metadata in a structured document such as an XML format.

The local content DB 140 stores contents received from the CP by content. To connect the stored content with the stored metadata, the content may be stored using an identification number shown in FIG. 6 as a file name. In this case, the video, audio, and script can be stored in files named "221-1-501.avi", "221-1-502.mp3", and "221-1-503.doc", respectively.

The search result provider 150 stores local metadata and global metadata (collectively referred to as "overall metadata") received from the global solution transaction server (200 of FIG. 3) in the local meta-DB 130 and provides a search result that matches a query from a terminal's user, i.e., an end user, to the terminal. For example, when the user queries for metadata whose genre is drama, the search result provider 150 provides metadata whose genre is drama to the user among the overall metadata. The overall metadata collectively includes global metadata and metadata for local MSPs converted from the global metadata by the master MSP 300.

That is, the local metadata refers to metadata converted into a plurality of languages required for the local MSPs 100 registered and connected to the global solution transaction server 200. Metadata converted into a plurality of languages may exist for a content from the same source.

The language converter 160 translates metadata generated by the metadata generator 120 into a universal language to register a content related to the metadata with the global solution transaction server 200 while converting a translatable content other than visual data (video, image, icon, etc.), such as an audio and a script, stored in the local content DB 140 into a universal language. This conversion may be performed using automatic translation or by transmitting original metadata to and receiving the converted metadata from an external translator.

The audio data in the content is converted into a universal language through dubbing (recording). Because it is complicated to convert it into a universal language, this process may be omitted. While it is more efficient to directly dub Korean audio data into another local language in the master MSP 300, it is assumed in the present exemplary embodiment that the audio data is converted into a universal language to maintain consistency throughout the specification.

In addition, the language converter 160 generates a local electronic catalog using global metadata and/or a global electronic catalog provided from the global solution transaction server 200. For example, an electronic catalog having a format shown in FIG. 6 may be generated. In addition, a global electronic catalog may be simply translated and used as a local electronic catalog. However, it is preferable, but not necessary, to use both a global electronic catalog and global metadata to generate a local electronic catalog in consideration of local circumstances.

The transceiver 180 transmits the converted metadata and content provided by the CP and stored in the local content DB 140 to the global solution transaction server 200 while receiving the shared overall metadata and a content (image, audio, script, etc.) other than a video content from the global solution transaction server 200 and the master MSP 300, respectively. Upon request from the global solution transaction server 200, the transceiver 180 also transmits a video content to another local MSP or receives a video content from another local MSP. The transceiver 180 receives a search query from a terminal's user and transmits (downloads) or streams a specific content to the terminal's user.

The user authenticator 190 determines whether a customer terminal's user has the right to access a specific content and authenticates the user having the right to access the content. User authentication may be performed by entering an ID/password or using any method that can identify the user. The existence of the access right can be determined according to whether payment has been made for the specific content. However, various other payment methods such as post-payment and periodic payment may be used according to the type of agreement between the terminal's user and the local MSP.

The content combiner 170 combines a video content received from another local MSP with a converted audio content provided by the master MSP 300 or combines a source audio content with a script in order to create a final content formatted according to a local language. In this way, the local MSP 100 combines the video, audio, and script together before transmission to the user. Alternatively, the local MSP 100 may transmit the video separately from the audio to the user. In this case, a user's play device synchronizes the video and audio for playing.

Figure 8:
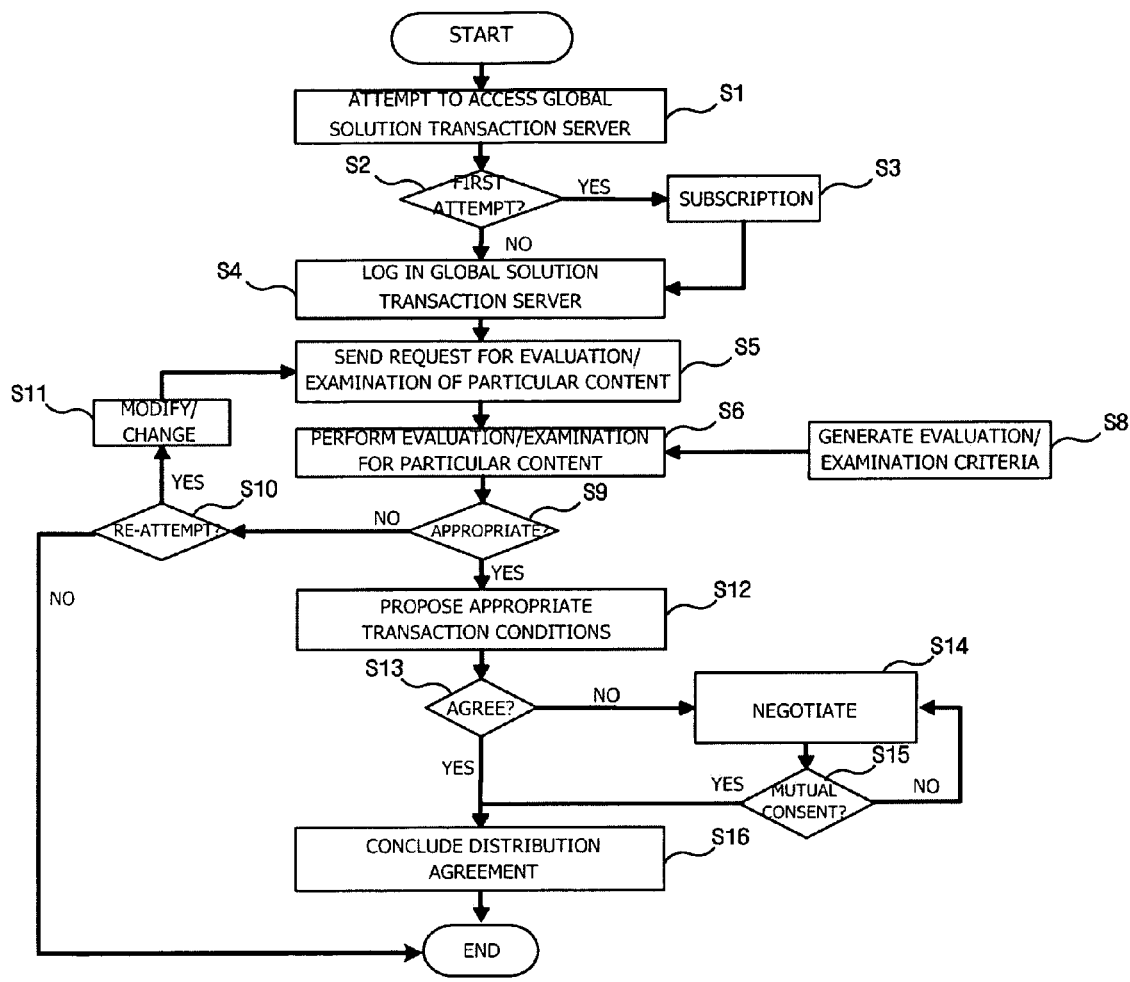
FIG. 8 is a flowchart illustrating a transaction negotiation process in particular content registration according to an exemplary embodiment of the present invention.

The content register 195 registers contents received from CPs in the global solution transaction server 200 and performs a transaction negotiation with the global solution transaction server 200 with regard to the contents to be shared. In particular content registration, a transaction negotiation process between the sending local MSP 100 and the global solution transaction server 200 will now be described in more detail in reference to FIG. 8.

First, the content register 195 attempts to access the global solution transaction server 200 through a user interface (not shown) such as a web browser in step S1. If the accessing is the first attempt to the global solution transaction server 200 (YES in step S2), the content register 195 subscribes in the global solution transaction server 200 in step S3. The content register 195 logs in to the global solution transaction server 200 through a subscription or a logging operation using an ID and a password in step S4. When logging in the global solution transaction server 200 in this way, real-time updating security program may automatically run, thereby preventing an unauthorized third party from accessing the global solution transaction server 200.

A request for evaluation/examination of a particular content is sent to the global solution transaction server 200 in step S5. The global solution transaction server 200 performs evaluation/examination on the particular content in step S6. The evaluation/examination is based on content evaluation/examination criteria concluded by the global solution transaction server 200 in step S8. The evaluation/examination may be intentionally made by human intervention. Otherwise, after predetermined evaluation/examination standards are determined, the evaluation/examination may be automatically made by checking whether the predetermined evaluation/examination standards are met or not. The evaluation/examination standards may include, for example, a moving picture length, picture quality, format, and so on.

If the examined content is determined as being inappropriate (NO in step S9), the local MSP 100 may abandon registration of the content or may re-attempt evaluation/examination. In the latter case (YES in S10), the particular content is modified/changed in S11 and the procedure goes back to S5.

If the examined content is determined as being appropriate (YES in step S9), the content register 195 proposes appropriate transaction conditions for the particular content to the global solution transaction server 200 in step S12. If the global solution transaction server 200 does not agree on the proposed conditions (NO in step S13), conditions proposed by both parties are negotiated in step S14. If the proposed price is agreed on (YES in step S13), a content distribution agreement is concluded between the local MSP 100 and the global solution transaction server 200, in step S16. There may be a variety of conditions of the content distribution agreement including an agreement by period/sale achievement, a fixed sum system/variable sum system, a final agreement/conditional agreement, and so on.

In such a manner, the preliminary negotiation/transaction steps for content registration are completed, the content register 195 transmits the particular content, except a video content if the particular content includes the video content, and metadata converted in the language converter 160 to the global solution transaction server 200 through the transceiver 180.

The merchandiser 196 merchandizes contents shared by the global solution transaction server 200 in a corresponding local MSP. A merchandising process will be described in more detail with reference to FIG. 9. This process means a process of a pertinent portion of the local MSP 100 merchandizing a content registered by another local MSP.

First, the merchandizer 196 of the local MSP 100 searches for a global electronic catalog and metadata through a predetermined interface of the global solution transaction server 200 in step S 31. In this case, a sample content can be briefly viewed through PREVIEW. In addition, the merchandiser 196 of the local MSP 100 selects a particular content among the contents shared in the global solution transaction server 200 in step S32. The content selection by the local MSP 100 means selection of a product to be sold in a market including the local MSP 100, among global digital contents provided by the global solution transaction server 200.

Then, the global solution transaction server 200 proposes sale agreement conditions for the particular content to the local MSP 100 in step S33. If the merchandiser 196 does not agree on the proposed conditions (NO in step S34), conditions proposed by both parties are negotiated in step S35. If the both parties reach a consent (YES in step S36) or the merchandiser 196 agrees on the proposed conditions (YES in step S34), a content distribution agreement is concluded between the local MSP 100 and the global solution transaction server 200, in step S37. There may be a variety of methods of concluding the content distribution agreement, including coalition between the local MSP 100 and the global solution transaction server 200, selling contents using the end customer terminal 15 with the proviso that post-payment is made, guarantee of a minimum purchase quantity or a minimum amount, and so on.

In step S38, the merchandizer 196 generates a local electronic catalog of a local language version, which can be used by the end customer terminal 15, using the global metadata and/or global electronic catalog. Alternatively, the language converter may generate the local electronic catalog using the same. For example, an electronic catalog having a format shown in FIG. 6 may be generated. It is obvious in the art that a relatively complicated electronic catalog can be generated for the purpose of promoting a merchandizing effect.

The merchandiser 196 registers the generated local electronic catalog in the local meta-DB 130 in step S39, and supplies the end customer terminal 15 with the local electronic catalog in step S40. The providing of the local electronic catalog means that the local electronic catalog is allowed to peruse or download.

Then, the end customer terminal 15 is able to inquire the local electronic catalog to search for a desired content and may select the same by referring to the local electronic catalog.

Figure 10:
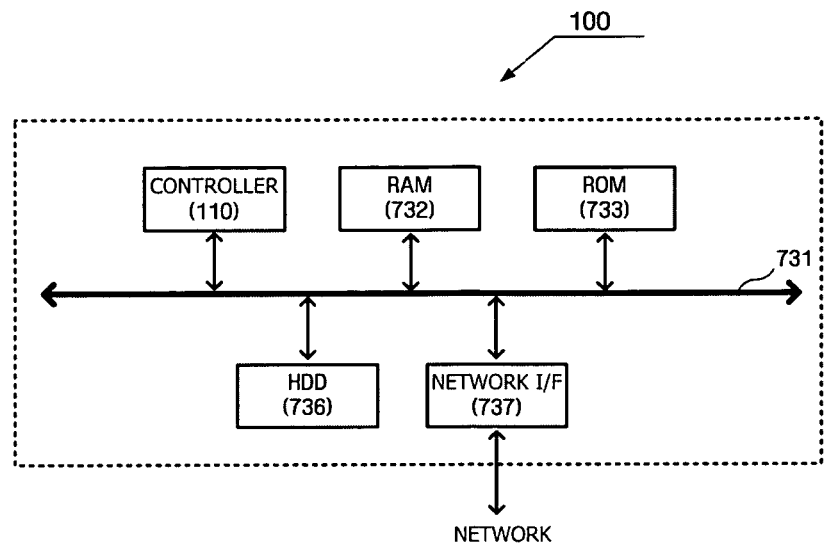
FIG. 10 is a block diagram of the local MSP of FIG. 5 implemented using physical blocks according to an exemplary embodiment of the present invention.

The local MSP 100 organized in logical blocks as shown in FIG. 5 can also be implemented using physical blocks as shown in FIG. 10. Referring to FIG. 10, the local MSP 100 includes a controller 110 including a CPU, and a random access memory (RAM) 732, a read-only memory (ROM) 733, a hard disk drive (HDD) 736 and a network interface (I/F) 737 connected to the controller 110 via a bus 731.

The controller 110 reads various programs prestored in the ROM 733 and executes the various programs in the RAM 732 to perform the same operations as the operations of the metadata generator 120, the search result provider 150, the language converter 160, the content combiner 170, the user authenticator 190, the content register 195, and the merchandizer 196 according to the various programs.

More specifically, the local MSP 100 executes the same operations of the components shown in FIG. 5 according to the various programs prestored in the ROM 733. Alternatively, program storage media storing the various programs may be installed into the local MSP 100 to perform the same operations. The program storage media storing the various programs may be implemented as any type of package media, such as for example, flexible disks, CD-ROMs, DVDs, or semiconductor memories or magnetic disks, etc. in which a variety of programs are temporarily or permanently stored. In addition, storage means for storing the program in the storage media may include wired or wireless communication media such as for example, LAN or internet, any communication interfaces such as for example, routers or modems, and so on.

While the transceiver 180 includes a physical network interface (I/F) 737, it is a broad term that encompasses hardware and software required to transmit and receive data such as a Transport Control Protocol (TCP)/User Datagram Protocol (UDP) layer and an Internet Protocol (IP) layer that are higher layers realized in software. The local meta-DB 130 and the local content DB 140 may be understood as at least one region of the HDD 736.

Figure 11:
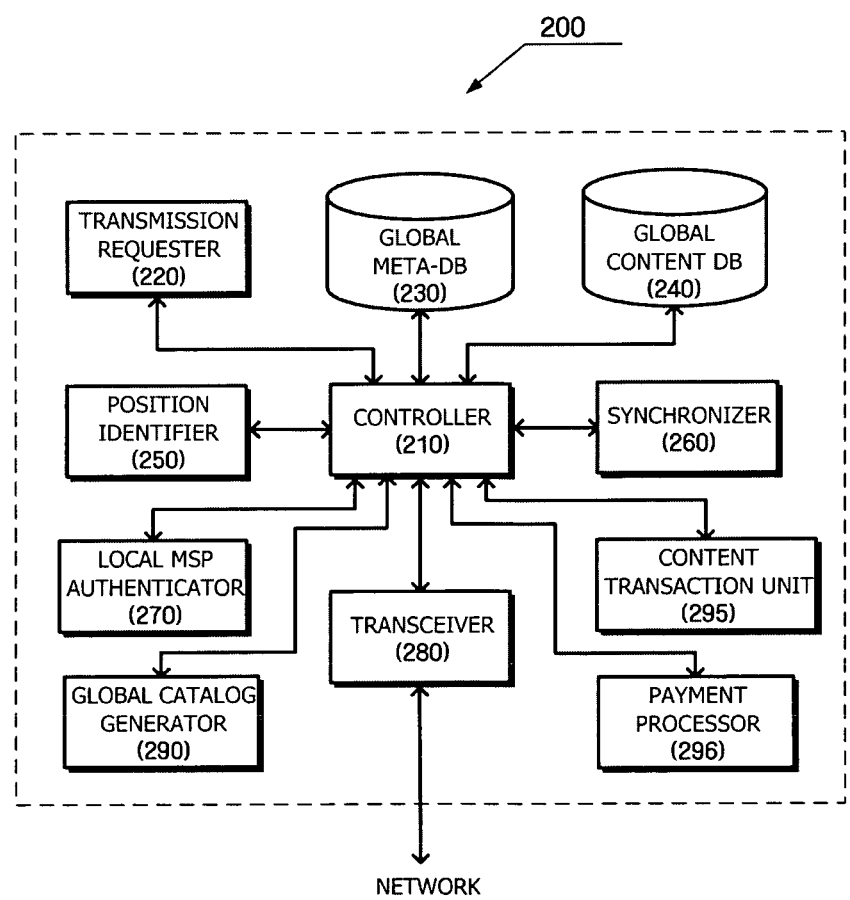
FIG. 11 is a block diagram of a global solution transaction server according to an exemplary embodiment of the present invention.

FIG. 11 is a block diagram of the global solution transaction server 200 according to an exemplary embodiment of the present invention. Referring to FIG. 11, the global solution transaction server 200 includes a controller 210, a transmission requester 220, a global meta-DB 230, a global content DB 240, a position identifier 250, a synchronizer 260, a local MSP authenticator 270, a transceiver 280, a global catalog generator 290, a content transaction unit 295, and a payment processor 296.

The controller 210 controls the operation of other components in the global solution transaction server 200 and includes a central processing unit (CPU) and an operating system (OS).

Figure 14:
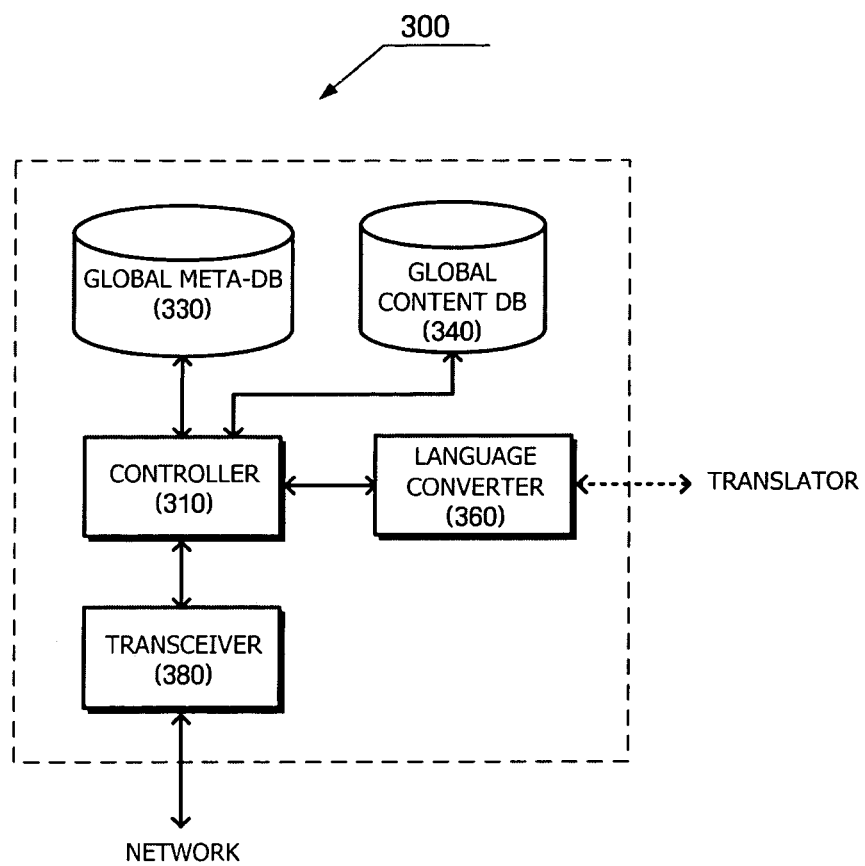
FIG. 14 is a block diagram of a master MSP according to an exemplary embodiment of the present invention.

The synchronizer 260 periodically synchronizes the global meta-DB 230 with the global meta-DB 330 in the master MSP 300 in FIG. 14. That is, the synchronizer 260 allows metadata present in the global meta-DB 230 (metadata transmitted from the local MSP 100 and stored) to be stored in the global meta-DB 330 while allowing metadata present in the global meta-DB 330 (metadata converted by the master MSP 300) to be stored in the global meta-DB 230.

The global meta-DB 230 stores metadata converted into a universal language and received from the local MSP 100 and metadata converted into a local language by the master MSP 300 and received through the transceiver 280. The global content DB 240 temporarily stores a content (except a video content) received from the local MSP 100.

The local MSP authenticator 270 determines whether the local MSP 100 requesting transaction has the right to access a specific content and authenticates the local MSP 100 having the right to access the content. Like in the user authentication, local MSP authentication may be performed by entering an ID/password or electronic signature and any method that can identify a device or an administrator, without limitations. The existence of the access right can be determined according to whether payment has been made for a required content, which is, however, for illustration only. Rather, various other payment methods such as post-payment and periodic payment may be used according to the type of agreement between the terminal's user and the local MSP.

The position identifier 250 identifies the position where a content requested by the authenticated local MSP 100 is stored (specific MSP or Uniform Resource Identifier (URI) of the MSP). For example, the position can be identified by metadata associated with the requested content that is transmitted upon request for purchase of the content from the local MSP 100.

A transmission requester 220 requests a local MSP holding the required content or the master MSP 300 to open a link with the local MSP 100 requesting the content.

The transceiver 280 transmits metadata to the master MSP 300 or receives metadata from the master MSP 300. In addition, the transceiver 280 receives metadata converted into a universal language and a content other than a video content and transmits the content temporarily stored in the global content DB 240 to the local MSP 100. Further, the transceiver 280 receives a request for purchase of a content from the local MSP 100 and provides the metadata, which is stored in the global meta-DB 230 synchronized with the global meta-DB 330 in the master MSP 300, to local MSPs connected to the global solution transaction server 200.

The global catalog generator 290 generates a global electronic catalog using global metadata and local metadata. The global electronic catalog is an electronic document written in a universal language for merchandizing contents stored in the global content DB 240. The global electronic catalog may be in the form of a web page or word processor document. The global electronic catalog is not necessarily generated but, upon request from the end customer terminal 15, a local electronic catalog is generated by the local MSP 100 using the metadata of a local language version. However, since there may also be a merchandizing activity between the global solution transaction server 200 and the local MSP 100, the global solution transaction server 200 may generate a local electronic catalog to provide the same to the receiving local MSP 100.

The content transaction unit 295 concludes a content transaction agreement between the global solution transaction server 200 and the receiving local MSP 100 and provides a corresponding content, such as a video, an audio or an image, to the receiving local MSP 100. Operations performed by the content transaction unit 295 will be described in more detail with reference to FIG. 12.

Figure 9:
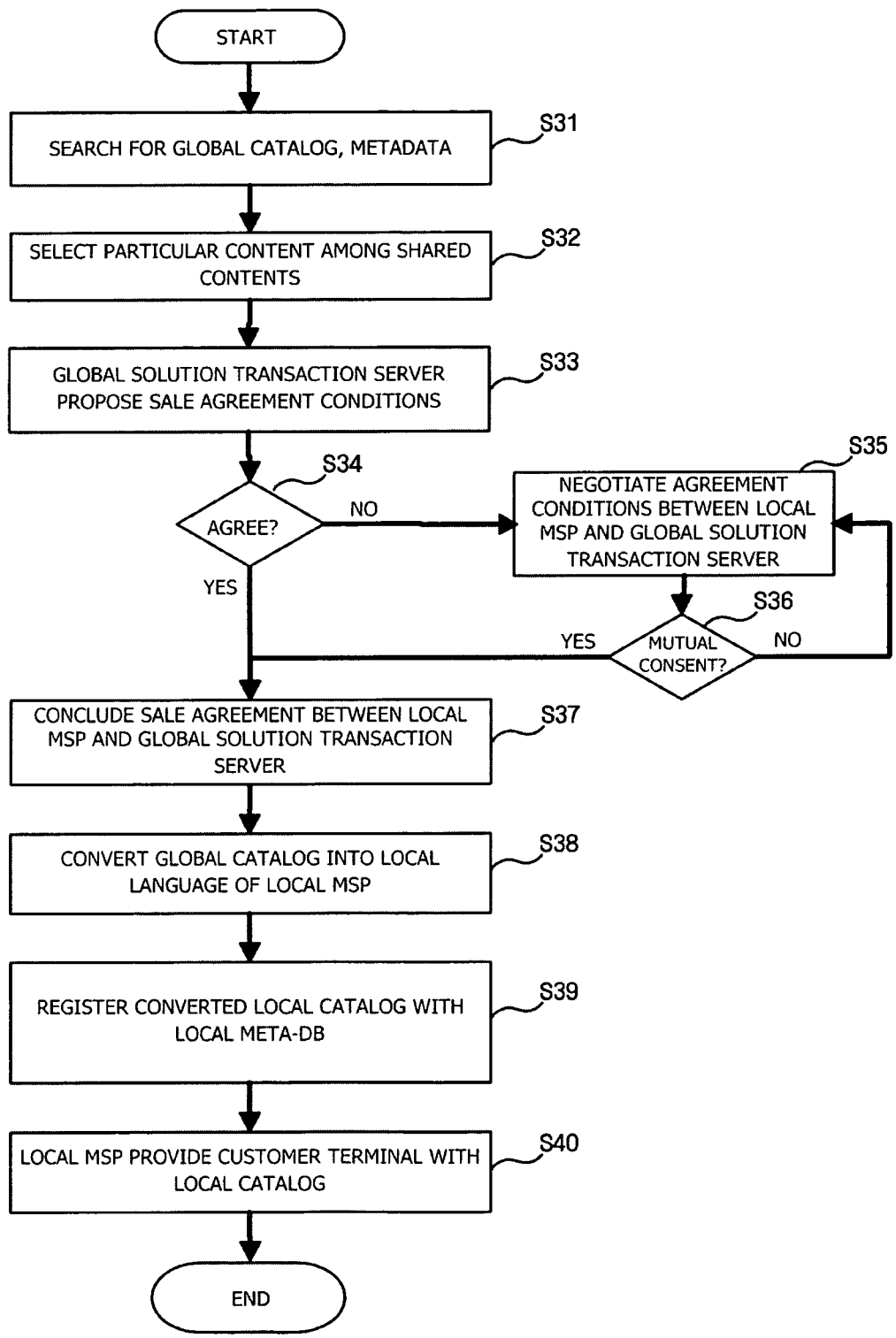
FIG. 9 shows a merchandising process performed in a receiving local MSP according to an exemplary embodiment of the present invention.
Figure 12:
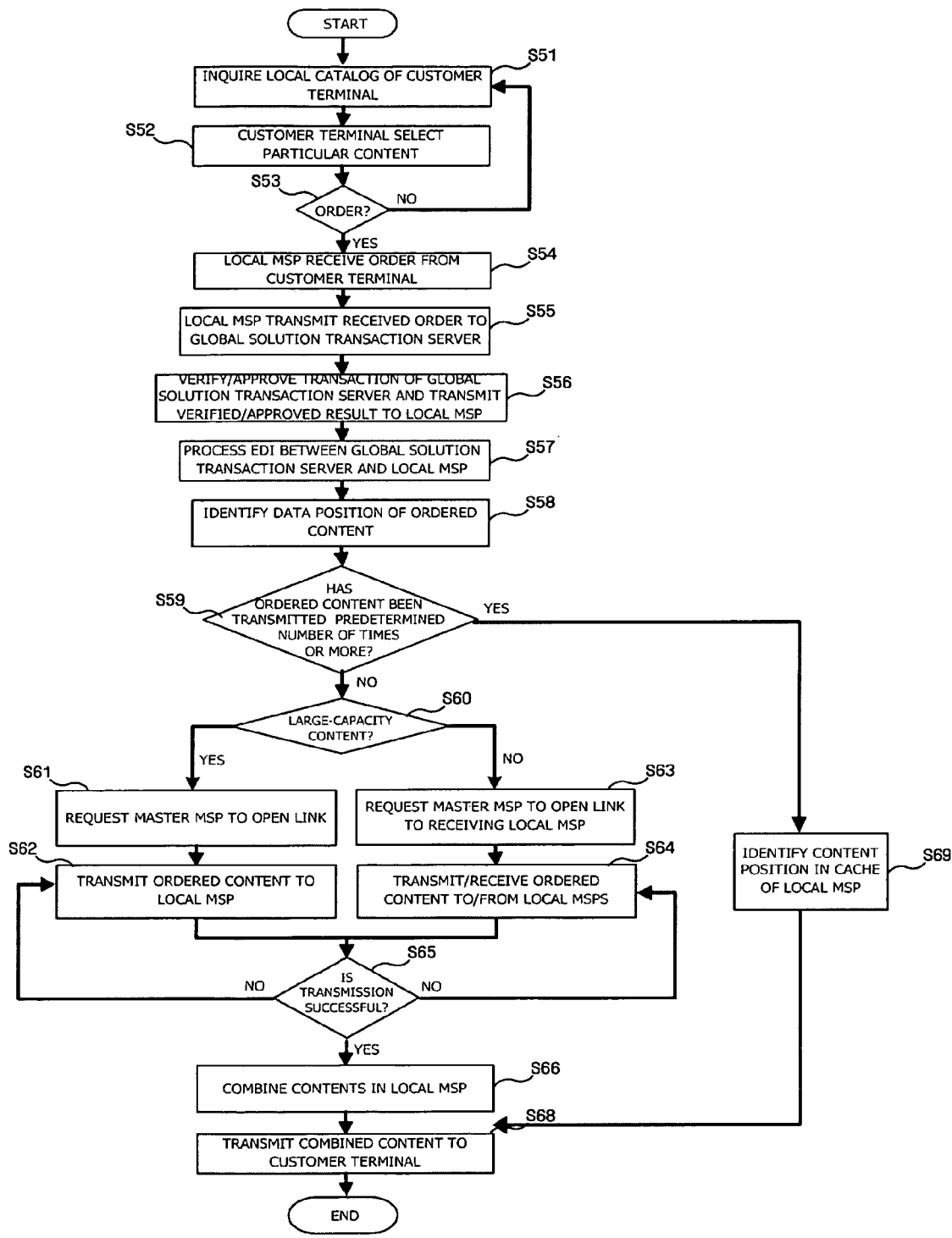
FIG. 12 shows an example of an operation performed by a content transaction unit of the global solution transaction server shown in FIG. 11.

In FIG. 9, steps S33, S34, S35, S36 and S37 correspond to a process of a distribution transaction agreement for a particular content between the content transaction unit 295 and the merchandizer 196 of the receiving local MSP 100 shown in FIG. 5. Through this process, based on the concluded distribution transaction agreement for the particular content, the process shown in FIG. 12 is performed.

First, the end customer terminal 15 inquires a local catalog provided by the receiving local MSP 100 in step S51 and selects a particular content in step S52. If the particular content is ordered (YES in step S53), the receiving local MSP 100 receives an order from the end customer terminal 15 for the content in step S54. Placing and receiving orders may be performed through an ordering web site offered by the receiving local MSP 100. Accordingly, the receiving local MSP 100 transmits the received order to the global solution transaction server 200 in step S55.

The content transaction unit 295 of the global solution transaction server 200 verifies/approves the transaction through the local MSP authenticator 270 and the verified/approved result is then transmitted to the receiving local MSP 100 in step S56. In step S57, EDI is processed between the global solution transaction server 200 and the receiving local MSP 100. The EDI processing includes on-line processing of, for example, an order letter, an agreement, a trade or exchange processed document, or other electronic documents.

Then, the content transaction unit 295 identifies a position of the ordered content through the position identifier 250. The position can be represented by URI such as Uniform Resource Locator (URL) or Uniform Resource Name (URN).

As the result of position identification, if the ordered content has been transmitted to the receiving local MSP 100 a predetermined number of times or more (YES in step S59), the receiving local MSP 100 may store the content in its own cache for later use. Thus, subsequent transmission steps may be omitted. Conditions for being stored in the cache are described as follows. For example, when an average data transmission rate between a receiving local MSP and a sending local MSP is a predetermined level or lower, that is, when there has been a request for the same video data a predetermined number of times or more between remotely located local MSPs, the video data can be stored in a cache memory of the receiving local MSP for a given period or longer.

If NO in step S59, it is determined in step S60 whether or not the content is a large capacity content. In the exemplary embodiment of the present invention, a relatively large-capacity content, e.g., a video content, is stored in the sending local MSP while a relatively small-capacity content is stored in the master MSP. By doing so, efficient utilization of resources in the network is enabled and downloading efficiency and service quality are ensured compared to the conventional method in which the video, audio and script are combined together for transmission.

If NO in step S60 as the result of determination, the content transaction unit 295 requests the master MSP 300 to open a link to the receiving local MSP in order to transmit the ordered content to the receiving local MSP in step S61. Then, the master MSP 300 transmits the ordered content to the receiving local MSP in step S62.

If YES in step S60 as the result of determination, the content transaction unit 295 requests the sending local MSP to open a link to the receiving local MSP in order to transmit the ordered content from the sending local MSP having stored the ordered content in step S61. Then, the sending local MSP transmits the ordered content to the receiving local MSP in step S64.

In this case, the sending local MSP may change the quality of a video content transmitted according to the agreement concluded between the receiving local MSP and the global solution transaction server 200. The quality of video data may vary according to the resolution, frame rate, bit rate, and so on. Recent video coding techniques provide scalability, that is, different video streams with a variety of resolution levels, frame rates, or bit rates can be easily generated from a single coded video stream. Scalability with respect to a resolution level can be supported by wavelet coding or multi-layer coding. Scalability with respect to a frame rate can be supported by Motion Compensated Temporal Filtering (MCTF), or Unconstrained MCTF (UMCTF). In addition, scalability with respect to a bit rate can be supported by Fine Granular Scalability (FGS) coding, or embedded quantization. The local MSP 100a may easily change the quality of video by truncating a portion of scalable video stream.

If transmission step S62 or S64 is not successful (NO in step S65), step S62 or S64 is repeated for retransmission and if transmission step S62 or S64 is successful (YES in step S65), the receiving local MSP 100 combines a small-capacity content with a large-capacity content using the content combiner 170 to reconstruct a single content. For example, a moving picture content can be generated by combining video and audio contents, or video, audio and script contents. Then, the receiving local MSP 100 transmits the reconstructed content to the end customer terminal 15 through the transceiver 180 in step S68.

Figure 13:
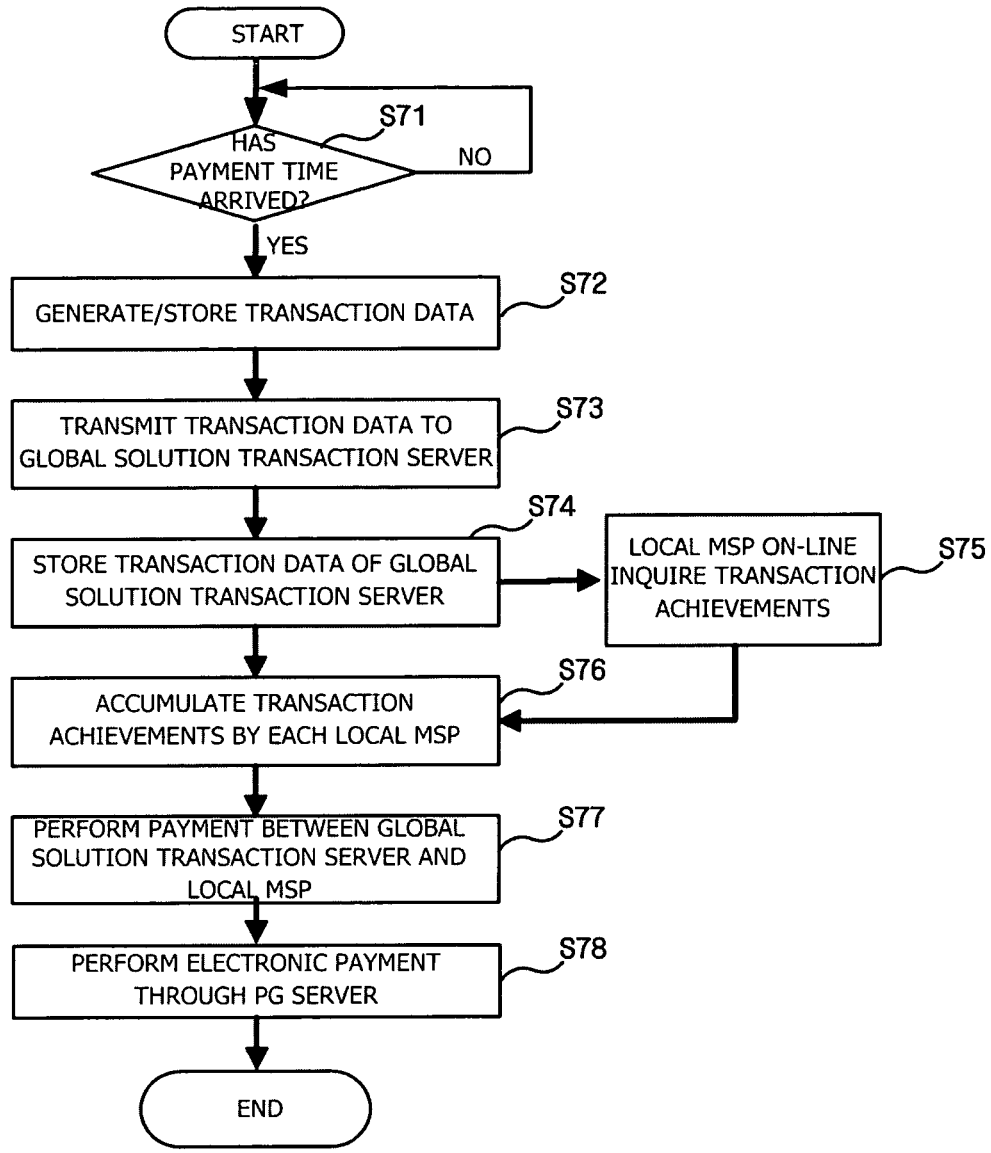
FIG. 13 shows an example of an operation performed by a payment processing unit of the global solution transaction server shown in FIG. 11.

Referring back to FIG. 11, the payment processor 296 performs payment for transaction between the global solution transaction server 200 and the sending local MSP or between the global solution transaction server 200 and the receiving local MSP by transaction period or number of transaction times. The payment process will be described with reference to FIG. 13.

If a payment time has arrived, that is to say, if a predetermined payment period has elapsed or a predetermined number of transaction times have reached (YES in step S71), the local MSP 100 generates data regarding the terminated transaction with the global solution transaction server 200 and stores the same in step S72. The generated transaction data is transmitted to the global solution transaction server 200 in step S73.

The global solution transaction server 200 having received the transaction data stores the same in a predetermined memory (not shown) in step S74 and the payment processor 296 provides the local MSP 100 with the same for on-line inquiry in step S75.

The payment processor 296 computes transaction achievements by each local MSP in step S76. In other words, a total amount to pay or to be paid is computed according to a content distribution agreement between the content transaction unit 295 and the content register 195 of the local MSP 100 or a content usage agreement between the content transaction unit 295 and the merchandizer 196 of the local MSP 100.

In addition, the payment processor 296 processes payment in step S77 based on the balance between the total amount to be paid and the total amount to pay in step S77. According to the payment result, the global solution transaction server 200 and the corresponding local MSP 100 perform electronic payment through the external PG server 13.

The global solution transaction server 200 organized in logical blocks as shown in FIG. 11 can be implemented using physical blocks as shown in FIG. 10. Those skilled in the art will readily be able to physically implement the global solution transaction server 200 without a repetitive explanation.

FIG. 14 is a block diagram of a master MSP 300 according to an exemplary embodiment of the present invention. Referring to FIG. 14, the master MSP 300 includes a controller 310, a global meta-DB 330, a global content DB 340, a language converter 360, and a transceiver 380.

The controller 310 controls the operation of other components in the master MSP 300 and includes a central processing unit (CPU) and an operating system (OS).

The global meta-DB 330 stores metadata in a universal language received from the global solution transaction server 200, i.e., global metadata as well as metadata in local languages obtained by the language converter 360. The metadata written in various languages for the same content and the global metadata are collectively referred to as "overall metadata."

The global content DB 340 stores a content (except a video content) received from the global solution transaction server 200 as well as a content in local languages generated by the language converter 360.

The language converter 360 converts the received metadata in a universal language into metadata in local languages while translating the received content (except a video content) into a content in local languages. For example, a content converted into local languages may mean a dubbed content in the local languages (audio) or a script translated into the local languages (script). The conversion may be performed by automatically recognizing letters or sound or receiving an input of an external translator or voice actor.

Here, the local languages refer to all languages required by local MSPs connected to the global solution transaction server 200. For example, when the Korean, Chinese, Japanese, and U.S. local MSPs are registered with and connected to the global solution transaction server 200, the universal language can be English and the local languages may include Korean, Chinese and Japanese.

The transceiver 380 receives the converted metadata, i.e., global metadata and a content (except a video content) from the global solution transaction server 200. Upon request from the global solution transaction server 200, the transceiver 380 also transmits metadata converted into a local language to the global solution transaction server 200 and a content (except a video content) in the local language to a corresponding local MSP.

The master MSP 300 implemented using logical blocks as shown in FIG. 14 can be implemented physically as shown in FIG. 10. Those skilled in the art will readily be able to physically implement the master MSP 300 without a repetitive explanation.

While it is described above that the global solution transaction server 200 and the master MSP 300 are separate systems, both of them may be combined into a single global MSP 400.

Figure 15:
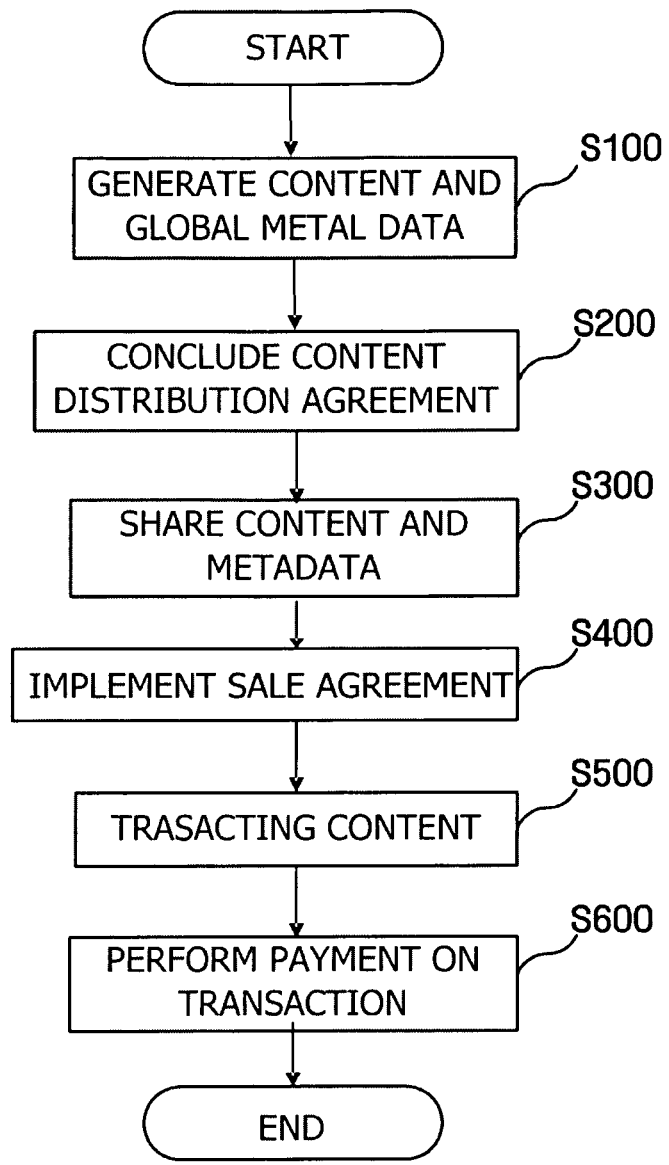
FIG. 15 is a schematic flowchart illustrating an overall digital content transaction process according to an exemplary embodiment of the present invention.

FIG. 15 is a schematic flowchart illustrating an overall digital content transaction process according to an exemplary embodiment of the present invention. Referring to FIG. 15, the entire process includes steps of generating a content and global metadata for the content (S100), concluding a content distribution agreement between the sending local MSP and the global MSP (S200), sharing the registered content and global metadata between the sending local MSP and the global MSP (S300), implementing a sales agreement between the receiving local MSP and the global MSP for at least selected some of shared contents (S400), receiving the selected some contents from the global MSP and transmitting the same to the customer terminal (S500), and performing payment based on the transaction between each of the sending local MSP, the receiving MSP and the global MSP (S600).

A system and method for globally distributing a digital content and service according to an exemplary embodiment of the present invention will now be described in detail.

Figure 16:
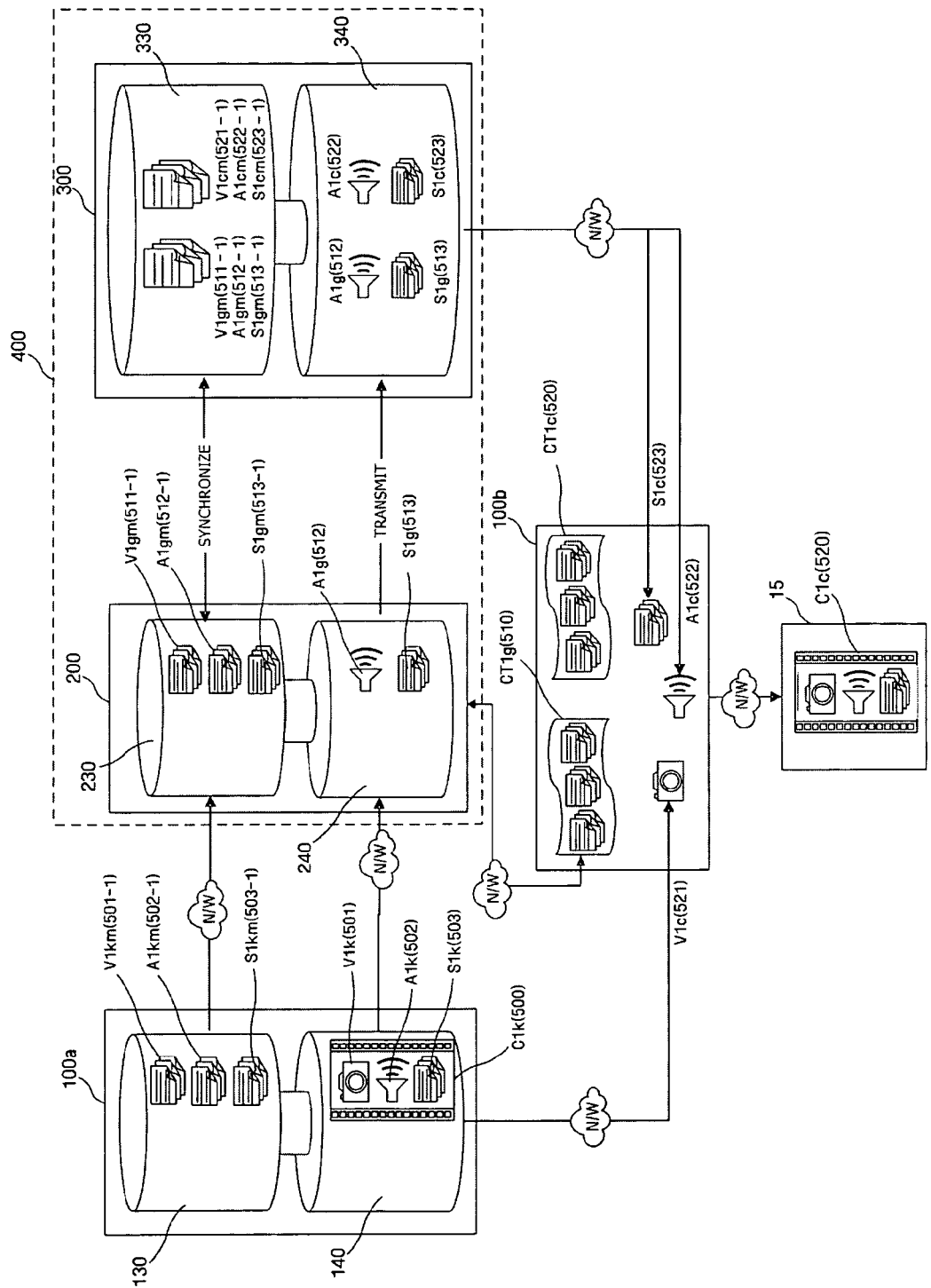
FIG. 16 is a detailed diagram showing the digital content sharing/transaction method according to an exemplary embodiment of the present invention.

In the following description, there is shown an example of distributing a moving picture content between Korea and China using different languages in real time. Here, it is assumed that a consumer in China purchases a Korean moving picture content. Referring to FIG. 16, when an end user's terminal 15 in China searches for a global content through a Chinese local MSP 100*b* and sends a purchase request for a selected Korean moving picture content $C1k$ 500 to a Korean local MSP 100*a*, the Korean local MSP 100*a* performs a global content transaction with the Chinese local MSP 100*b* and a master MSP 200 through a solution transaction server 200 and transmits a content converted into a Chinese language to the end user's terminal 15. The distribution of a global content is based on globally shared overall metadata and global connections among MSPs 100*a*, 100*b*, and 300, which will be described in greater detail with reference to FIG. 17.

Figure 17:
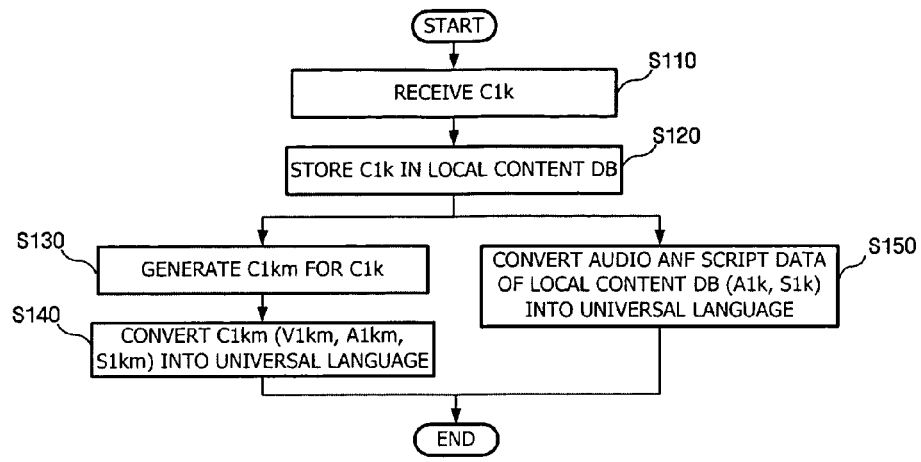
FIG. 17 is a detailed flowchart illustrating step S100 shown in FIG. 15 according to an exemplary embodiment of the present invention.

FIG. 17 is a detailed flowchart illustrating step S100 shown in FIG. 15.

Referring to FIG. 17, in step S100, a content is received. More specifically, in step S110, a Korean local MSP 100a receives moving picture content C1k 500 from a content provider. In step S120, the Korean local MSP 100a segments the received content C1k 500 into video V1k 501, audio A1k 502, and script data S1k 503 and stores the video V1k 501, the audio A1k 502, and the script data S1k 503 in a local content DB 140.

In step 130, the local MSP 100a generates metadata V1km 501-1, A1km 502-1, and S1km 503-1 associated with the video V1k 501, the audio A1k 502, and the script data S1k 503 and stores the metadata V1km 501-1, A1km 502-1, and S1km 503-1 in a local meta-DB 130. In step S140, the stored metadata V1km 501-1, A1km 502-1, and S1km 503-1 are converted into a universal language to generate global metadata V1gm 511-1, A1gm 512-1, and S1gm 513-1.

In step S150, the original audio data A1k 502 and the script data S1k 503 stored in the local content DB 140 are converted into a universal language to generate audio data A1g 512 dubbed in a universal language and script data S1g 513 converted into a universal language.

The audio data is converted into a universal language through dubbing (recording). Because it is complicated to convert the audio data into a universal language, this process may be omitted. While it is more efficient to directly dub Korean audio data into another local language in the master MSP 300, it is assumed in the present exemplary embodiment that the audio data is converted into a universal language to maintain consistency throughout the specification.

Then, in step S200, a content distribution agreement is concluded between the sending local MSP 100a and the global MSP. First, in order to transmit and share the global metadata 511-1, 512-1, and 513-1 and the converted audio data and script data A1g 512 and S1g 513, the sending local MSP 100a performs the content registration process described above with reference to FIG. 8. In such a manner, once the content distribution agreement for the content C1k 500 is concluded, the sending local MSP 100a registers the global metadata with the global meta-DB 230 of the global solution transaction server 200 and registers the audio data and script data A1g 502 and S1g 503 with the global content DB 240. The global metadata may include the title in a universal language, file type, size, genre, length, language, creation date, owner, price of the content, sample moving picture, and so on. The type of the distribution agreement is determined in the course of consultation, in forms of a variety of types, including indemnification according to transaction performance, minimum guarantee, and so on.

Figure 18:
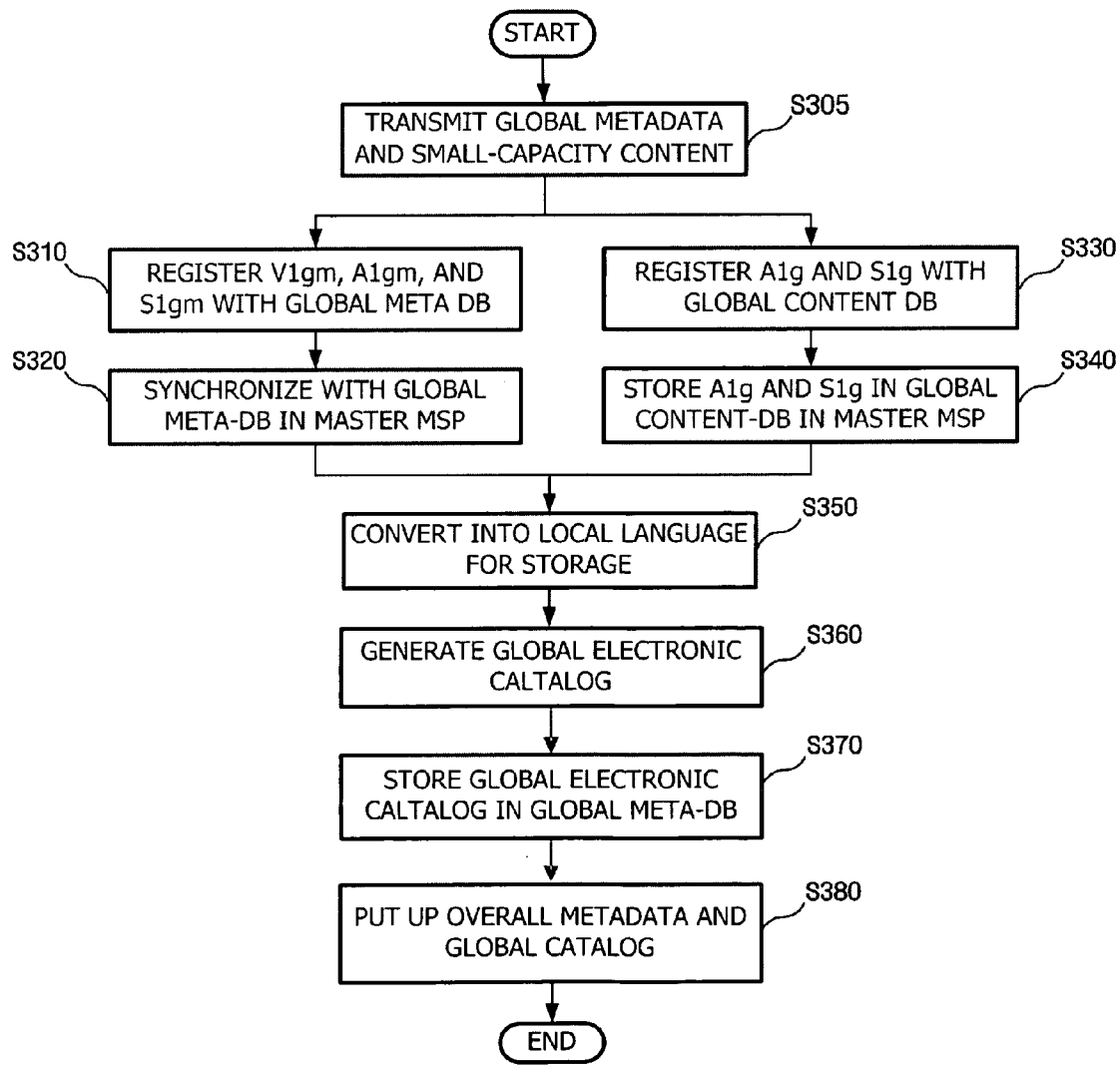
FIG. 18 is a detailed flowchart illustrating step S300 shown in FIG. 15 according to an exemplary embodiment of the present invention.

Next, the step of sharing the registered contents and the global metadata between the local MSP and the global MSP 400 will now be described with reference to FIG. 18.

First, small-capacity contents among the global metadata generated from the sending local MSP and the contents, e.g., audio or script contents, are transmitted to the global solution transaction server 200 in step S300.

In step S310, the global solution transaction server 200 registers the global metadata V1gm 511-1, A1gm 512-1, and S1gm 513-1 with the global meta-DB 230 which is synchronized with the global meta-DB 300 in the master MSP 300 in step S320. In step S330, the global solution transaction server 200 registers the received audio data A1g 502 and script data S1g 503 with the global content DB 240 and transmits the same to the master MSP 300 through the transceiver 280. In step S340, the master MSP 300 stores the received audio data A1g 502 and script data S1g 503 in the global content DB 340.

The video data V1k 301 remains in the local MSP 100a in order to reduce server and network cost and prevent overload due to repetitive transmission of large-capacity files.

The master MSP 300 converts the audio data A1g 512 and script data S1g 513 received from the global solution transaction server 200 into local languages of the local MSPs 100a and 100b subscribing to the global MSP 400 and stores the same in a global content DB 340. The converted audio and script are denoted by A1c 522 and S1c 523, respectively. The master MSP 300 also converts the global metadata V1gm 511-1, A1gm 512-1, and S1gm 513-1 into local languages and stores the converted metadata 521-1, 522-1, and 523-1 in a global meta-DB 330 in step S350.

Because the global meta-DB 230 in the global solution transaction server 200 is frequently synchronized with the global meta-DB 330 in the master MSP 300, the converted metadata 521-1, 522-1, and 523-1 can also be used in the global solution transaction server 200.

In step S360, the global catalog generator 290 of the global solution transaction server 200 generates a global electronic catalog using the global metadata 511-1, 512-1 and 513-1. The global electronic catalog is produced in a universal language and provided in the form of a web page or word processor document. For example, an electronic catalog having a format shown in FIG. 6 may be generated. In addition, a global electronic catalog may be used as a local electronic catalog.

The generated global electronic catalog CT1g 510 is stored in the global meta-DB 230 and can be synchronized with the global meta-DB 330 of the master MSP 300 like the other metadata in step S370.

In step S380, the global solution transaction server 200 puts up the global metadata 511-1, 512-1 and 513-1 on a global interface (not shown) that the local MSPs 100a and 100b access. In such a manner, the metadata and the contents are shared. The metadata are shared in the local MSP 100a, 100b without a particular condition and the contents are provided through a predetermined transaction. Specifically, large-capacity contents, e.g., video contents, are stored in the local MSP 100a, while small-capacity contents, e.g., audio, script or image contents, are stored in the master MSP 300 so as to be shared by the local MSP 100b.

In step S400, a sales agreement for at least some of the shared contents is concluded between the receiving local MSP and the global MSP. Specifically, the steps shown in FIG. 9 are performed by the receiving local MSP 100b and the global solution transaction server 200. The step (S500) of receiving the selected contents from the global MSP and transmitting the same to the customer terminal is the same as the corresponding step shown in FIG. 12. Finally, in step S600, payment based on the transaction between each of the sending local MSP, the receiving local MSP, and the global MSP is performed, which is the same as the corresponding step shown in FIG. 13 and a repeated explanation will not be given.

As described above, the present invention allows an end user in China to request purchase of a Korean moving picture content existing in Korea through the local MSP 100b in China to which he/she subscribes and purchase the moving picture content converted into a Chinese language in real time, thereby easily providing the end user with global content services, which were conventionally impossible.

Based on the foregoing, the present invention provides at least the following advantages.

First, digital content data are separately stored in a local MSP and a master MSP so that only a minimum data can be stored in a solution transaction server, thereby minimizing an overload in digital content transaction and increasing efficiency in system operation.

Second, since the global solution transaction server of the present invention evaluates/examines quality of a digital content before the local MSP registers the digital content for approval of the quality of the digital content, the customer can be assured of the consistency in quality of the digital content.

Third, the present invention provides integrated management of global standards of digital contents, systemized digital contents, and global transaction details in a predetermined memory area provided in the global solution transaction server in transaction between integrated platforms of the digital contents.

Fourth, the local MSP of the present invention allows individuals or small-and-medium-sized content providers who have weak brand power or e-business handling ability to easily access to the global solution transaction server, so that their business scopes can extend globally.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the invention.

What is claimed is:

1. A method for sharing and transacting content between a plurality of local multi-service platforms (MSPs) and a global MSP, connected to each other and implemented on at least one hardware platform, the method comprising:

receiving, by a processor of a first local MSP among the plurality of local MSPs, content from a content provider;

registering, by the processor of the first local MSP, the received content from the content provider with the global MSP;

segmenting, by the processor of the first local MSP, the received content into a plurality of sub-contents;

storing, by the processor of the first local MSP, the received content;

transmitting, by the processor of the first local MSP, a portion of the segmented sub contents to the global MSP;

storing, by a processor of the global MSP, the transmitted portion of the sub-contents at the global MSP temporarily;

sharing the registered content between the first local MSP and the global MSP;

storing, by the processor of the global MSP, metadata for the registered content at the first local MSP and the global MSP;

determining, by the processor of the global MSP, whether a purchase request for the content from a customer terminal at a second local MSP is received;

based on a determination by the processor of the global MSP that the purchase request for the content from the customer terminal at the second local MSP is received, generating a supply agreement between the global MSP and the second local MSP for the content including at least a part of a remaining portion of the sub-contents stored in the first local MSP;

receiving, by a processor of the second local MSP, all or a part of the portion of the sub-contents and all or a part of the remaining portion of the sub-contents from the global MSP and the first local MSP, respectively, according to the generated supply agreement for the content;

combining, by the processor of the second local MSP, the all or part of the portion of the sub-contents and the all or part of the remaining portion of the sub-contents into desired content; and transmitting, by the processor of the second local MSP, the desired content to the customer terminal.

2. The method of claim 1, wherein the storing the transmitted portion of the sub-contents at the global MSP comprises:

determining a portion of the sub-contents which satisfies a predetermined condition; and storing the portion of the sub-contents determined to satisfy the predetermined condition at the global MSP.

3. The method of claim 2, wherein the predetermined condition comprises at least one of size, quality and format of the portion of the sub-contents.

4. The method of claim 1, wherein the storing metadata comprises storing metadata for each of the sub-contents.

5. The method of claim 4, wherein the storing metadata for each of the sub-contents comprises:

storing global metadata represented by a global spoken language, the global spoken language being universally used in the first local MSP, the second local MSP, and the global MSP; and storing local metadata represented by a local spoken language, the local spoken language being used in a specific local MSP.

6. The method of claim 1, further comprising storing metadata for the content at the global MSP for an access from the second local MSP.

7. The method of claim 1, further comprising:

generating an electronic catalog for the content based on the metadata; and transmitting the electronic catalog to the second local MSP, for an access from the customer terminal.

8. The method of claim 7, wherein the generating the electronic catalog comprises generating at least one of a global electronic catalog represented in a global spoken language, a first local electronic catalog represented in a first local spoken language and a second local electronic catalog represented in a second local spoken language, wherein the global spoken language is universally used in the first local MSP, the second local MSP, and the global MSP, and the first and second local spoken languages are used in the first and second local MSPs, respectively.

9. The method of claim 8, further comprising:

sending the electronic catalog to the customer terminal.

10. The method of claim 1, wherein the storing the received content comprises storing the segmented content represented in a local spoken language at the first local MSP, wherein the local spoken languages is used in the first local MSP, and wherein the storing the portion of the sub-contents comprises storing the transmitted portion of the sub-contents represented in a global spoken language at the global MSP, wherein the global spoken language is universally used in the first local MSP, the second local MSP, and the global MSP.

11. The method of claim 1, further comprising implementing a distribution agreement between the global MSP and the first local MSP through which the portion of the sub-contents is stored at the global MSP.

12. The method of claim 11, wherein the implementing the distribution agreement comprises:

accessing the global MSP for logging;

sending an on-line request for the storing the portion of the sub-contents at the global MSP;

examining the portion of the sub-contents; and
based on a determination that the portion of the sub-contents satisfies a predetermined condition, concluding the distribution agreement.

13. The method of claim 1, wherein the portion of the sub-contents stored in the global MSP is determined by a size of the portion of the sub-contents.

14. The method of claim 1, wherein:
the content comprises multimedia content;
receiving the all or part of the portion of the sub-contents from the global MSP comprises receiving at least one of audio data and a script of the multimedia content from the global MSP; and
receiving the all or part of the remaining portion of the sub-contents comprises receiving video data of the multimedia content from the first local MSP.

15. The method of claim 1, further comprising:
determining whether a number of transmission of the portion of the sub-contents to the customer terminal through the second local MSP reaches a predetermined number; and
storing the portion of the sub-contents in a cache memory of the second local MSP when it is determined that the predetermined number is reached.

16. The method of claim 1, further comprising performing at least one of payment for the storing between the global MSP and the first local MSP and payment for the transmitting between the global MSP and the second local MSP,
wherein the performing at least one of the payment for the storing and the payment for the transmitting comprises:
accumulating results of at least one of the storing and the transmitting when a payment time for at least one of the storing and the transmitting arrives and calculating a payment amount for at least one of the storing and the transmitting; and
implementing electronic payment for the calculated payment amount through an external payment gateway server.

17. The method of claim 16, wherein the performing at least one of the payment comprises performing at least one of payment for the storing between the global MSP and the first local MSP and payment for the transmitting between the global MSP and the second local MSP when a predetermined payment period arrives or a predetermined number of times of at least one of the storing and the transmitting is reached.

18. The method of claim 1, further comprising transmitting the metadata to the second local MSP.

19. The method of claim 1, wherein the storing the metadata comprises storing global metadata represented by a global spoken language at the global MSP and first local metadata represented by a first local spoken language at the first local MSP, and
wherein the global spoken language is universally used in the first local MSP, the second local MSP, and the global MSP, and the first local spoken language is used in the first local MSP.

20. The method of claim 19, further comprising:
generating a second local metadata represented by a second local spoken language based on the metadata, wherein the second local spoken language is used in the second local MSP; and
transmitting at least one of the global metadata and the second local metadata to the second local MSP.

21. The method of claim 1, wherein the storing the transmitted portion of the sub-content comprises storing at least one of audio data and a script of the content which are represented in at least one of a first local spoken language, a second local spoken language and a global spoken language, and
wherein the metadata is represented in at least one of the first local spoken language, the second local spoken language and the global spoken language, and
wherein the global spoken language is universally used in the first local MSP, the second local MSP, and the global MSP, and the first and second local spoken languages are used in the first and second local MSPs, respectively.

22. The method of claim 21, further comprising:
generating an electronic catalog for the content based on the metadata; and
transmitting the electronic catalog to the second local MSP for an access by the customer terminal.

23. The method of claim 22, wherein the generating the electronic catalog comprises generating at least one of a global electronic catalog represented in the global spoken language, a first local electronic catalog represented in the first local spoken language and a second local electronic catalog represented in the second local spoken language.

24. The method of claim 23, further comprising transmitting at least one of the global electronic catalog and the second local electronic catalog to the second local MSP.

25. The method of claim 14, wherein transmitting the at least one of the audio data and the script of the multimedia content comprises transmitting at least one of the audio data and the script represented in at least one of a first local spoken language, a second local spoken language and a global spoken language, and
wherein the storing the metadata for the content comprises storing the metadata represented in at least one of the first local spoken language, the second local spoken language and the global spoken language, and
wherein the global spoken language is universally used in the first local MSP, the second local MSP, and the global MSP, and the first and second local spoken languages are used in the first and second local MSPs, respectively.

26. The method of claim 25, further comprising:
generating an electronic catalog for the content based on the metadata; and
transmitting the electronic catalog to the second local MSP for an access by the customer terminal.

27. The method of claim 26, wherein the generating the electronic catalog comprises generating at least one of a global electronic catalog represented in the global spoken language, a first local electronic catalog represented in the first local spoken language and a second local electronic catalog represented in the second local spoken language, wherein the global spoken language is universally used in the first local MSP, the second local MSP, and the global MSP, and the first and second local spoken languages are used in the first and second local MSPs, respectively.

28. The method of claim 27, further comprising transmitting at least one of the global electronic catalog and the second local electronic catalog to the second local MSP.

29. A system for sharing and transacting content, the system comprising:
a first local multi-service platform (MSP) comprising:
at least one first processor; and
at least one first memory that stores computer program, which, when executed by the at least one first processor, causes the at least one first processor to perform:
receiving content from a content provider;
segmenting the received content into a plurality of sub-contents;
storing the received content; and
transmitting a portion of the segmented sub-contents;

a global MSP comprising:
  at least one second processor; and
  at least one second memory that stores computer program, which, when executed by the at least one second processor, causes the at least one second processor to perform:
    receiving the transmitted portion of the sub-contents;
    storing the received portion of the sub-contents temporarily, wherein the first MSP registers the received content from the content provider with the global MSP, the registered content are shared between the first local MSP and the global MSP, and metadata for the registered content are stored at the first local MSP and the global MSP;
    determining whether a purchase request for the content from a customer terminal at a second local MSP is received; and
    based on a determination by the global MSP that the purchase request for the content from the customer terminal at the second local MSP is received, generating a supply agreement between the global MSP and the second local MSP for the content including at least a part of a remaining portion of the sub-contents stored in the first local MSP; and
the second local MSP comprising:
  at least one third processor; and
  at least one third memory that stores computer program, which, when executed by the at least one third processor, causes the at least one third processor to perform:
    receiving all or a part of the portion of the sub-contents and all or a part of the remaining portion of the sub-contents from the global MSP and the first local MSP, respectively, according to the generated supply agreement for the content;
    combining the all or part of the portion of the sub-contents and the all or part of the remaining portion of the sub-contents into desired content; and
    transmitting the desired content to the customer terminal.

* * * * *